(12) United States Patent
Despois et al.

(10) Patent No.: US 12,067,645 B2
(45) Date of Patent: Aug. 20, 2024

(54) HIGH-RESOLUTION CONTROLLABLE FACE AGING WITH SPATIALLY-AWARE CONDITIONAL GANS

(71) Applicant: L'Oreal, Paris (FR)

(72) Inventors: Julien Despois, Paris (FR); Frederic Flament, Paris (FR); Matthieu Perrot, Paris (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 17/363,098

(22) Filed: Jun. 30, 2021

(65) Prior Publication Data

US 2021/0407153 A1 Dec. 30, 2021

Related U.S. Application Data

(60) Provisional application No. 63/046,011, filed on Jun. 30, 2020.

(30) Foreign Application Priority Data

Sep. 11, 2020 (FR) ...................................... 2009199

(51) Int. Cl.
*G06T 11/00* (2006.01)
*A45D 44/00* (2006.01)
(Continued)

(52) U.S. Cl.
CPC ............ *G06T 11/00* (2013.01); *A45D 44/005* (2013.01); *G06N 3/045* (2023.01); *G06N 3/088* (2013.01);
(Continued)

(58) Field of Classification Search
CPC ..................... G06T 11/00; G06T 7/012; G06T 2207/20081; G06T 2207/20084;
(Continued)

(56) References Cited

U.S. PATENT DOCUMENTS

2014/0229239 A1\* 8/2014 Hitchman ............... G06T 11/60
345/619
2018/0150684 A1\* 5/2018 Wang ........................ G06T 5/50
(Continued)

OTHER PUBLICATIONS

Li, P., Hu, Y., Li, Q., He, R., Sun, Z.: Global and Local Consistent Age Generative Adversarial Networks. arXiv preprint arXiv:1801.08390 (2018).\*
(Continued)

*Primary Examiner* — Jin Ge
(74) *Attorney, Agent, or Firm* — Oblon, McClelland, Maier & Neustadt, L.L.P.

(57) ABSTRACT

There are provided computing devices and methods, etc. to controllably transform an image of a face, including a high resolution image, to simulate continuous aging. Ethnicity-specific aging information and weak spatial supervision are used to guide the aging process defined through training a model comprising a GANs based generator. Aging maps present the ethnicity-specific aging information as skin sign scores or apparent age values. The scores are located in the map in association with a respective location of the skin sign zone of the face associated with the skin sign. Patch-based training, particularly in association with location information to differentiate similar patches from different parts of the face, is used to train on high resolution images while minimize resource usage.

27 Claims, 14 Drawing Sheets

(51) Int. Cl.
   | | |
   |---|---|
   | *G06N 3/045* | (2023.01) |
   | *G06N 3/088* | (2023.01) |
   | *G06Q 30/0601* | (2023.01) |
   | *G06T 7/00* | (2017.01) |
   | *G06V 10/44* | (2022.01) |
   | *G06V 10/50* | (2022.01) |
   | *G06V 10/764* | (2022.01) |
   | *G06V 10/774* | (2022.01) |
   | *G06V 10/82* | (2022.01) |
   | *G06V 40/16* | (2022.01) |

(52) U.S. Cl.
   CPC ..... *G06Q 30/0631* (2013.01); *G06Q 30/0643* (2013.01); *G06T 7/0012* (2013.01); *G06V 10/454* (2022.01); *G06V 10/50* (2022.01); *G06V 10/764* (2022.01); *G06V 10/765* (2022.01); *G06V 10/774* (2022.01); *G06V 10/82* (2022.01); *G06V 40/171* (2022.01); *G06T 2207/20081* (2013.01); *G06T 2207/20084* (2013.01); *G06T 2207/30088* (2013.01); *G06T 2207/30201* (2013.01)

(58) Field of Classification Search
   CPC ........... G06T 2207/30088; G06T 2207/30201; G06V 40/171; A54D 44/005; G06N 3/0454; G06N 3/088; G06Q 30/0631; G06Q 30/0643
   USPC ........................................................ 345/633
   See application file for complete search history.

(56) References Cited

U.S. PATENT DOCUMENTS

| | | | | |
|---|---|---|---|---|
| 2018/0350071 | A1* | 12/2018 | Purwar | G06V 10/25 |
| 2019/0213452 | A1* | 7/2019 | Ludwinski | G06V 30/194 |
| 2019/0362134 | A1* | 11/2019 | Kim | G06Q 50/10 |

OTHER PUBLICATIONS

Zhu, H., Huang, Z., Shan, H., Zhang, J.: Look globally, age locally: Face aging with an attention mechanism. arXiv preprint arXiv:1910.12771 (2019).*

Ksrkksinen, K., Joo, J.: Fairface: Face attribute dataset for balanced race, gender, and age. arXiv preprint arXiv:1908.04913 (2019).*

C. N. Duong, K. G. Quach, K. Luu, M. Savvides et al., "Temporal nonvolume preserving approach to facial age-progression and age-invariant face recognition," arXiv preprint arXiv:1703.08617, 2017.*

Agustsson, E., Timofte, R., Escalera, S., Baro, X., Guyon, I., Rothe, R.: Apparent and real age estimation in still images with deep residual regressors on appareal database. In: 2017 12th IEEE International Conference on Automatic Face & Gesture Recognition (FG 2017). pp. 87-94. IEEE (2017).

Antipov, G., Baccouche, M., Dugelay, J.L.: Face aging with conditional generative adversarial networks. In: 2017 IEEE international conference on image processing (ICIP). pp. 2089-2093. IEEE (2017).

Brock, A., Donahue, J., Simonyan, K.: Large scale gan training for high fidelity natural image synthesis. arXiv preprint arXiv:1809.11096 (2018).

Chen, B.C., Chen, C.S., Hsu, W.H.: Cross-age reference coding for age-invariant face recognition and retrieval. In: European conference on computer vision. pp. 768-783. Springer (2014).

Choi, Y., Choi, M., Kim, M., Ha, J.W., Kim, S., Choo, J.: Stargan: Unified generative adversarial networks for multi-domain image-to-image translation. In: Proceedings of the IEEE conference on computer vision and pattern recognition. pp. 8789- 8797 (2018).

Choi, Y., Uh, Y., Yoo, J., Ha, J.W.: Stargan v2: Diverse image synthesis for multiple domains. arXiv preprint arXiv:1912.01865 (2019).

Dalal, N., Triggs, B.: Histograms of oriented gradients for human detection. In: 2005 IEEE computer society conference on computer vision and pattern recognition (CVPR'05). vol. 1, pp. 886-893. IEEE (2005).

Goodfellow, I., Pouget-Abadie, J., Mirza, M., Xu, B., Warde-Farley, D., Ozair, S., Courville, A., Bengio, Y.: Generative adversarial nets. In: Advances in neural information processing systems. pp. 2672-2680 (2014).

Gulrajani, I., Ahmed, F., Arjovsky, M., Dumoulin, V., Courville, A.C.: Improved training of wasserstein gans. In: Advances in neural information processing systems. pp. 5767-5777 (2017).

Heljakka, A., Solin, A., Kannala, J.: Recursive chaining of reversible image-toimage translators for face aging. In: International Conference on Advanced Concepts for Intelligent Vision Systems. pp. 309-320. Springer (2018).

Heusel, M., Ramsauer, H., Unterthiner, T., Nessler, B., Hochreiter, S.: Gans trained by a two time-scale update rule converge to a local nash equilibrium. In: Advances in neural information processing systems. pp. 6626-6637 (2017).

Isola, P., Zhu, J.Y., Zhou, T., Efros, A.A.: Image-to-image translation with conditional adversarial networks. In: Proceedings of the IEEE conference on computer vision and pattern recognition. pp. 1125-1134 (2017).

K"arkk"ainen, K., Joo, J.: Fairface: Face attribute dataset for balanced race, gender, and age. arXiv preprint arXiv:1908.04913 (2019) 16 ECCV-20 submission ID 845.

Karras, T., Laine, S., Alla, T.: A style-based generator architecture for generative adversarial networks. In: Proceedings of the IEEE Conference on Computer Vision and Pattern Recognition. pp. 4401-4410 (2019).

Kingma, D.P., Ba, J.: Adam: A method for stochastic optimization. arXiv preprint arXiv:1412.6980 (2014).

Park, T., Liu, M.Y., Wang, T.C., Zhu, J.Y.: Semantic image synthesis with spatially-adaptive normalization. In: Proceedings of the IEEE Conference on Computer Vision and Pattern Recognition. pp. 2337-2346 (2019).

Pumarola, A., Agudo, A., Martinez, A.M., Sanfeliu, A., Moreno-Noguer, F.: Ganimation: Anatomically-aware facial animation from a single image. In: Proceedings of the European Conference on Computer Vision (ECCV). pp. 818-833 (2018).

Ricanek, K., Tesafaye, T.: Morph: A longitudinal image database of normal adult age-progression. In: 7th International Conference on Automatic Face and Gesture Recognition (FGR06). pp. 341-345. IEEE (2006).

Rothe, R., Timofte, R., Van Gool, L.: Dex: Deep expectation of apparent age from a single image. In: Proceedings of the IEEE international conference on computer vision workshops. pp. 10-15 (2015).

Song, J., Zhang, J., Gao, L., Liu, X., Shen, H.T.: Dual conditional gans for face aging and rejuvenation. In: IJCAI. pp. 899- 905 (2018).

Szegedy, C., Ioffe, S., Vanhoucke, V., Alemi, A.A.: Inception-v4, inception-resnet and the impact of residual connections on learning. In: Thirty-first AAAI conference on artificial intelligence (2017).

Wang, Z., Tang, X., Luo, W., Gao, S.: Face aging with identity-preserved conditional generative adversarial networks. In: Proceedings of the IEEE Conference on Computer Vision and Pattern Recognition. pp. 7939-7947 (2018).

Yazici, Y., Foo, C.S., Winkler, S., Yap, K.H., Piliouras, G., Chandrasekhar, V.: The unusual effectiveness of averaging in gan training. arXiv preprint arXiv:1806.04498 (2018).

Zeng, H., Lai, H., Yin, J.: Controllable face aging. arXiv preprint arXiv:1912.09694 (2019).

Zhang, R., Isola, P., Efros, A.A., Shechtman, E., Wang, O.: The unreasonable effectiveness of deep features as a perceptual metric. In: Proceedings of the IEEE Conference on Computer Vision and Pattern Recognition. pp. 586-595 (2018).

Zhu, H., Zhou, Q., Zhang, J., Wang, J.Z.: Facial aging and rejuvenation by conditional multi-adversarial autoencoder with ordinal regression. arXiv preprint arXiv:1804.02740 (2018).

(56) References Cited

OTHER PUBLICATIONS

Zhu, J.Y., Park, T., Isola, P., Efros, A.A.: Unpaired image-to-image translation using cycle-consistent adversarial networks. In: Proceedings of the IEEE international conference on computer vision. pp. 2223-2232 (2017).

Arjovsky, M., Chintala, S., Bottou, L.: Wasserstein GAN, arXiv preprint arXiv:1701.07875 (2017).

* cited by examiner

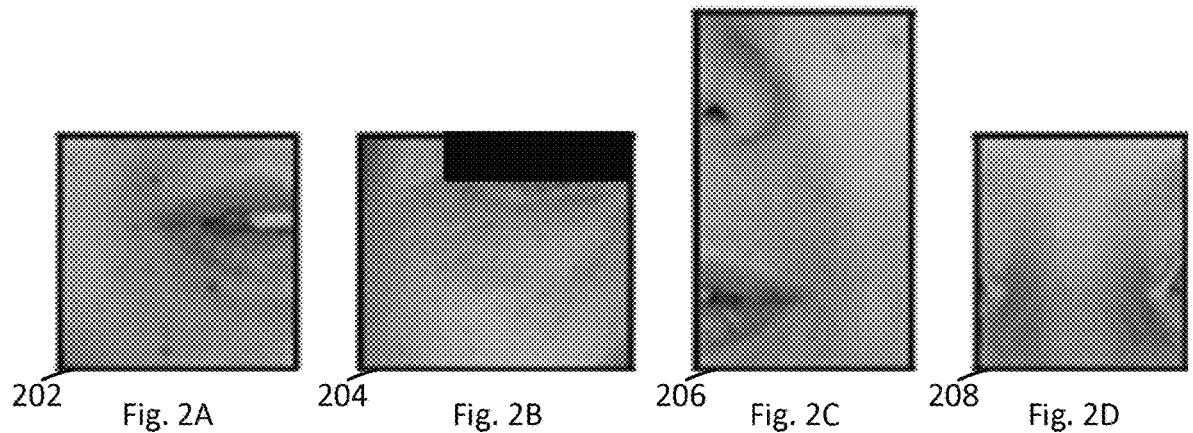
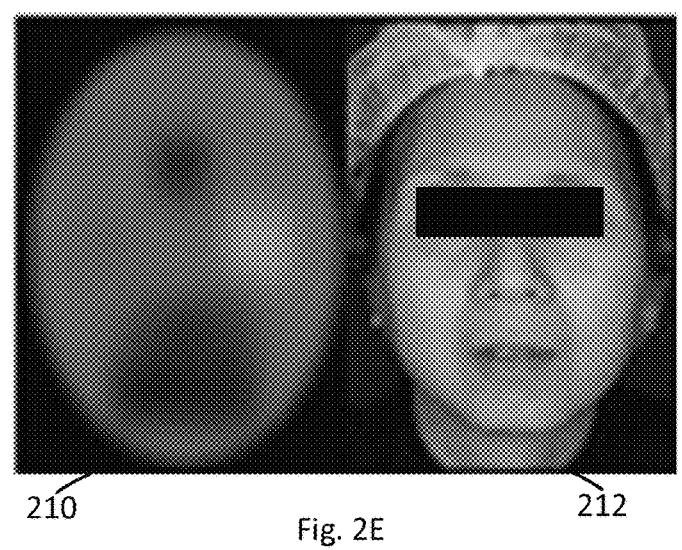
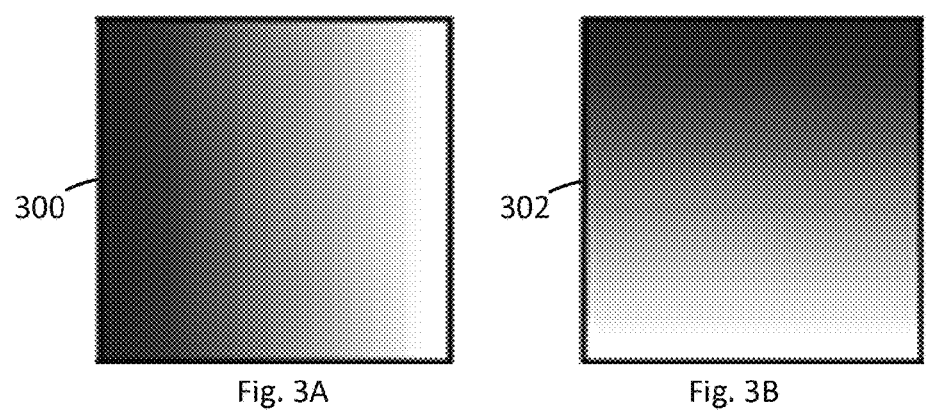

HIGH-RESOLUTION CONTROLLABLE FACE AGING WITH SPATIALLY-AWARE CONDITIONAL GANS

CROSS-REFERENCE TO RELATED APPLICATIONS

This application claims the benefit of priority from U.S. Provisional Application No. 63/046,011 filed Jun. 30, 2020, and claims the benefit of priority from French Application No. FR 2009199 filed Sep. 11, 2020, the entire contents of each of which are incorporated herein by reference.

FIELD

This disclosure relates to image processing and more particularly to high-resolution controllable face aging with spatially-aware conditional generative adversarial networks (GANs).

BACKGROUND

Face aging is an image synthesis task in which a reference image must be transformed to give the impression of a person of different age while preserving the identity and key facial features of the subject. When done correctly, this process can be used in various domains, from predicting the future appearance of a missing person to entertainment and educational uses. A focus may be placed on achieving high-resolution face aging, as such is a useful step towards capturing the fine details of aging (fine lines, pigmentation, etc.). In recent years, GANs [14] have allowed a learning-based approach for this task. The results, however, often lack in quality and only provide limited aging options. Popular models such as StarGAN [10] fail to produce convincing results without additional tweaks and modifications. This partially stems from the choice of reducing aging to one's real or apparent age [1]. Also, current approaches treat aging as a step-wise process, splitting age in bins (30-40, 40-50, 50+, etc.) [2, 16, 28, 30, 32].

In reality, aging is a continuous process that can take many forms depending on genetic factors such as facial features and ethnicity, as well as lifestyle choices (smoking, hydration, sun damage, etc.) or behavior. Notably, expression wrinkles are promoted by habitual facial expressions and can be prominent on the forehead, upper lip or at the corner of the eyes (crow's feet). In addition, aging is subjective as it depends on the cultural background of the person assessing the age. These factors call for a more fine-grained approach to face aging.

Existing approaches and datasets for face aging produce results skewed towards the mean, with individual variations and expression wrinkles often invisible or overlooked in favor of global patterns such as the fattening of the face. Moreover, they offer little to no control over the aging process and can difficultly be scaled to large images, thus preventing their usage in many real-world applications.

SUMMARY

In accordance with technologies methodologies herein, there are provided respective embodiments for computing devices and methods, etc. to controllably transform an image of a face, including a high resolution image, to simulate continuous aging. In an embodiment, ethnicity-specific aging information and weak spatial supervision are used to guide the aging process defined through training a model comprising a GANs based generator. In an embodiment, aging maps present the ethnicity-specific aging information as skin sign scores or apparent age values. In an embodiment, the scores are located in the map in association with a respective location of the skin sign zone of the face associated with the skin sign. In an embodiment, patch-based training, particularly in association with location information to differentiate similar patches from different parts of the face, is used to train on high resolution images while minimizing computational resource usage.

BRIEF DESCRIPTION OF THE DRAWINGS

FIGS. 2A, 2B, 2C, and 2D are images showing some respective aging sign zones of a face shown in FIG. 2E. FIG. 2E also shows an aging map for the face constructed from associated aging sign scores for the zones of the face according to an embodiment. Zones (a)-(d) shown in FIGS. 2A-2D are shown enlarged relative to FIG. 2E.

FIGS. 3A and 3B illustrate horizontal and vertical location gradient maps.

Drawings including facial images are masked for presentation purposes in this disclosure and are not masked when in use.

DETAILED DESCRIPTION

Figure 1:
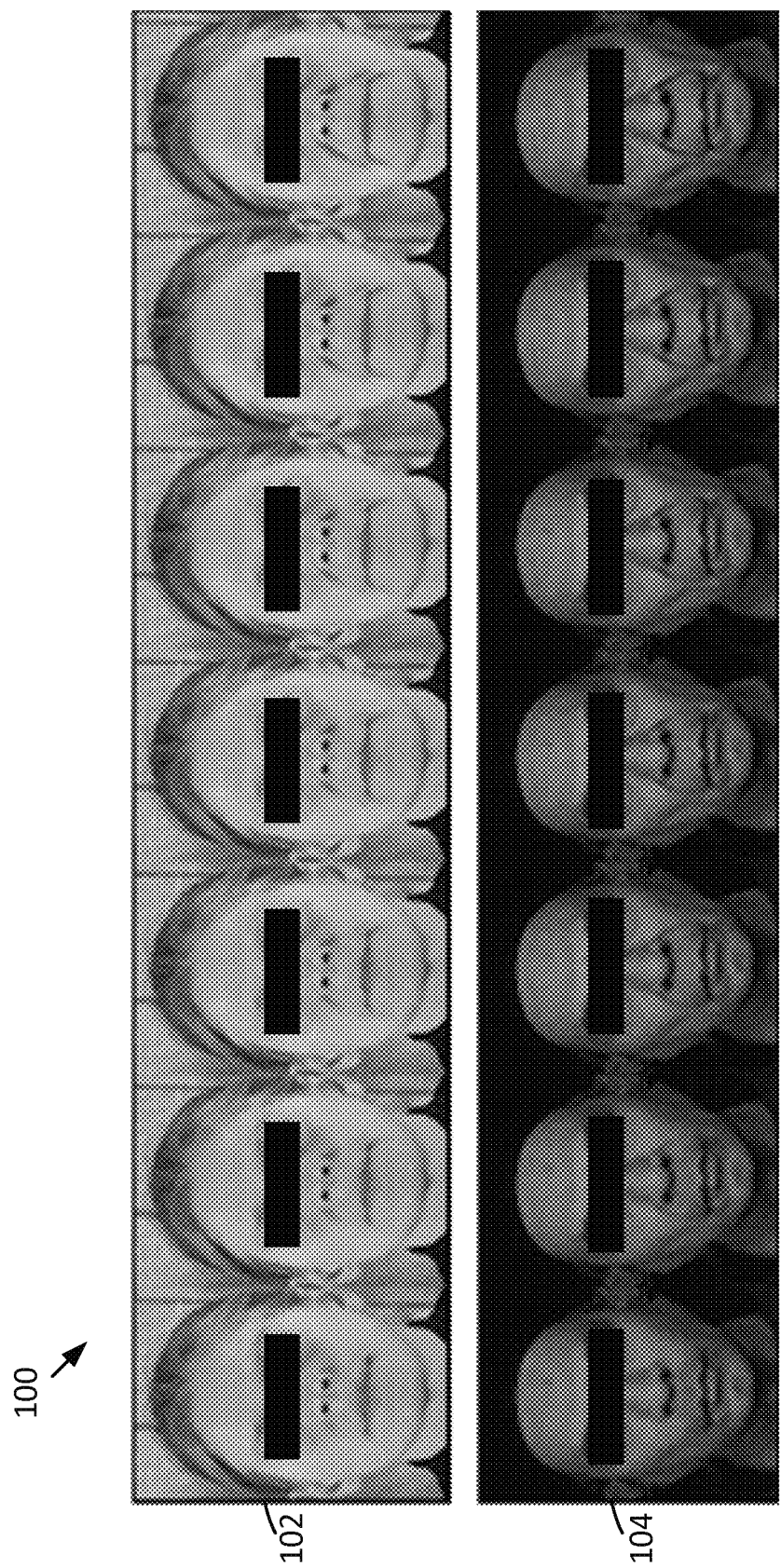
FIG. 1 is an array of high-resolution faces showing two faces in respective rows aged in a continuous manner according to an embodiment.

In accordance with technologies methodologies herein, in respective embodiments are systems and methods directed to obtaining high-resolution face aging results by creating a model capable of individually transforming local aging signs. FIG. 1 is an array 100 of high-resolution faces showing two faces in respective rows 102 and 104 aged in a continuous manner according to an embodiment.

In an embodiment, a curated high-resolution dataset is used in association with (a combination of) novel techniques to produce detailed state-of-the-art aging results. Clinical aging signs and weak spatial supervision allows fine-grained control over the aging process.

In an embodiment, a patch-based approach is introduced to enable inference on high-resolution images while keeping the computational cost of training the model low. This allows the model to give state-of-the-art aging results on a scale 4 times larger than previous methods.

Related Work

Conditional Generative Adversarial Networks (conditional GANs) [14] leverage the principle of an adversarial loss to force samples generated by a generative model to be indistinguishable from real samples. This approach led to impressive results, especially in the domain of image generation. GANs can be extended to generate images based on one or several conditions. The resulting conditional GANs are trained to generate images that satisfy both the realism and condition criteria.

Unpaired Image-to-Image Translation Conditional GANs are a powerful tool for image-to-image translation [18] tasks, where an input image is given to the model to synthesize a transformed image. StarGAN [10] introduced a way to use an additional condition to specify the desired transformation to be applied. They propose to feed the input condition to the generator in the form of feature maps [10] concatenated to the input image, but new approaches use more complex mechanisms such as AdaIN [20] or its 2D extension SPADE [22] to give the generator the condition in a more optimal manner. Where previous techniques required pixel-aligned training images in the different domains, recent works such as CycleGAN [34] and StarGAN [10] introduced a cycle-consistency loss to enable unpaired training between discrete domains. This has been extended in [23] to allow translation between continuous domains.

Face Aging

To age a face from a single picture, traditional approaches use training data of either one [2, 16, 30, 32, 33] or multiple images [26, 28] of the same person, along with the age of the person when the picture was taken. The use of longitudinal data, with multiple photos of the same person, offers less flexibility as it creates a heavy time-dependent constraint on the dataset collection.

The age is usually binned (e.g. grouped) into discrete age groups (20-30, 30-40, 40-50, 50+, etc.) [2,16,30,32], which frames the problem more simply, but limits the control over the aging process and doesn't allow the training to leverage the ordered nature of the groups. Disclosure in [33] addresses this limitation by considering age as a continuous value. Aging isn't objective as different skin types age differently, and different populations look for different signs of aging. Focusing on the apparent age as the guide for aging thus freezes the subjective point of view. Such approaches cannot be tailored to a population's perspective without requiring additional age estimation data from their point of view.

To improve the quality and level of details of the generated images, [32] use the attention mechanism from [23] in the generator. The generated samples are, however, low-definition images which are too coarse for real-world applications. Working at this scale hides some difficulties of generating realistic images, such as skin texture, fine lines and the overall sharpness of the details.

Approach

Problem Formulation

In an embodiment, a goal is to use single unpaired images to train a model able to generate realistic high-definition (e.g. 1024×1024) aged faces, with continuous control over the fine-grained aging signs to create smooth transformations between the original and transformed images. This is a more intuitive approach, as aging is a continuous process and age group bins do not explicitly enforce a logical order.

In an embodiment, a use of ethnic-specific skin atlases [4-7,13] incorporates the ethnic dimension of clinical aging signs. These atlases define numerous clinical signs such as the wrinkles underneath the eye, the ptosis of the lower part of the face, the density of pigmentary spots on the cheeks, etc. Each sign is linked to a specific zone on the face and scored on a scale that depends on ethnicity. Using these labels in addition to the age make for a more complete representation of aging, and allows transforming images with various combination of clinical signs and scores.

In an embodiment, FIGS. 2A, 2B, 2C, and 2D are images showing respective aging sign zones (a)-(d) (202, 204, 206 and 208) of a face 212 shown in FIG. 2E. Other sign zones are used but not shown. FIG. 2E also shows an aging map 210 for the face 212. Aging map 210 is constructed from associated aging sign scores for all of the zones of the face 212 according to an embodiment. It will be appreciated that zones (a)-(d) shown in FIGS. 2A-2D are shown enlarged relative to the face 212 of FIG. 2E. In an embodiment, the skin signs represent "age", "forehead wrinkles", "nasolabial fold", "wrinkles underneath the eye", "glabellar wrinkles", "inter ocular wrinkles", "corner lips wrinkles", "upper lip" and "ptosis of the lower part of the face". In an embodiment, other skin signs are used for which there is sufficient training etc. data.

In the aging map 210, the brightness of each pixel represents the normalized score of the localized clinical sign (e.g. wrinkles at the corner of the lips (a), underneath the eye wrinkles (b), nasolabial fold wrinkles (c), inter-ocular wrinkles (d), etc.). Where no aging sign score is available (defined), an apparent age value is used.

In other words, In an embodiment, the aging targets are passed to the network in the form of an aging map (e.g. 210) for a particular face image (e.g. 212). To do so, facial landmarks are computed and the relevant zone for each aging sign (e.g. see examples of FIGS. 2A-2D) is defined. Each zone (e.g. forehead (not shown as a zone in FIGS. 2A-2D)) is then filled with the score value of the corresponding sign (e.g. forehead wrinkles). In the present example for FIGS. 2A-2D, skin aging sign values for the applicable regions are (a) 0.11; (b) 0.36; (c) 0.31; and (d) 0.40. in an embodiment, the apparent age is used (via an estimator) or the actual age if available, to fill in the blanks where the clinical signs are not defined. Finally, a coarse mask is applied to the background of the image.

In an embodiment, the skin aging sign values (and apparent age, if used) are normalized on a scale between 0 and 1.

Treating the whole image at once would be ideal, but training a model with 1024×1024 images requires large computational resources. In an embodiment, a patch-based training approach is used to train the model, using only part of the image during training, and the corresponding patch portion of the aging map. Patch-based training reduces the context (i.e. global information) for the task but also reduces the computational resources required to process high-resolution images in large batches, as recommended in [8]. A large batch size is used on small patches of 128×128, 256×256 or 512×512 pixels. In an embodiment, the training samples a random patch each time the image is seen in the training process (about 300 times in such training).

The major drawback of the patch-based training is that small patches can look similar (e.g. forehead and cheek) yet must be aged differently (e.g. respectively horizontal and vertical wrinkles). With reference to FIGS. 3A and 3B, in an embodiment, to avoid wrinkles determined from an arithmetic mean on these ambiguous zones, a generator is provided with two patches coming respectively from a horizontal gradient location map 300 and a vertical gradient location map 302. Arithmetic mean wrinkles are not natural in appearance. This allows the model to know the position of the patch in order to differentiate between potentially ambiguous zones.

Network Architectures

In an embodiment, a training process is based on the StarGAN [10] framework. The generator is a fully convolutional encoder-decoder derived from [11] with SPADE [22] residual blocks in the decoder to incorporate the aging and location maps. This allows the model to leverage the spatial information present in an aging map, and use it at multiple scales in the decoder. To avoid learning unnecessary details, an attention mechanism from [23] is used to force the generator to transform the image only where needed. The discriminator is a modified version of [10], and produces the outputs for the WGAN [3] objective (given for an image i and aging map a in Equation 1), the estimation of the coordinates of the patch, and the low-resolution estimation of the aging map.

$$\mathbb{E}_{WGAN} = \mathcal{L}_i[D(i)] - \mathbb{E}_{i,a}[D(G(i,a))] \quad (1)$$

Figure 4:
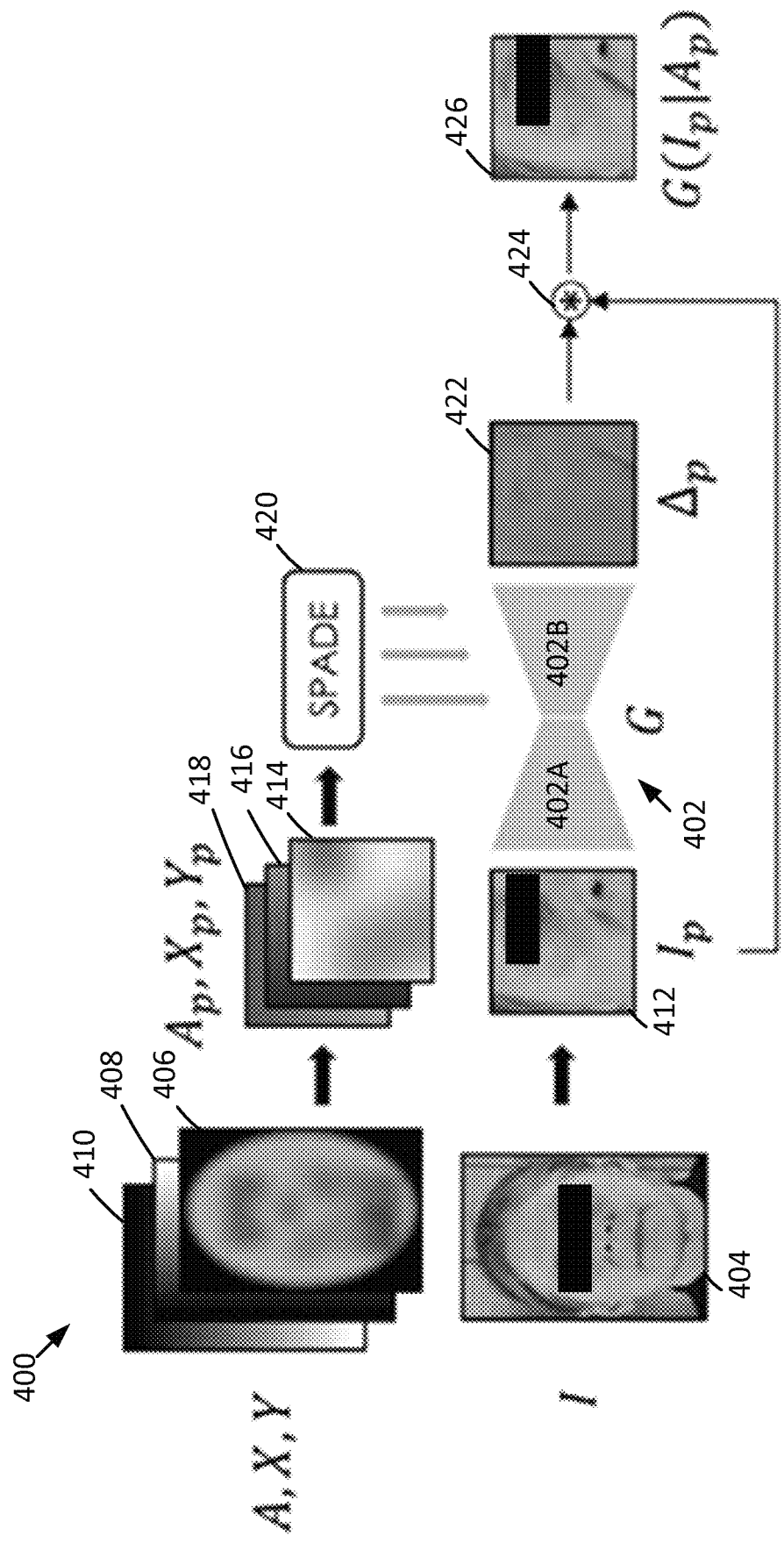
FIGS. 4 and 5 are illustrations of a training workflow according to an embodiment.
Figure 5:
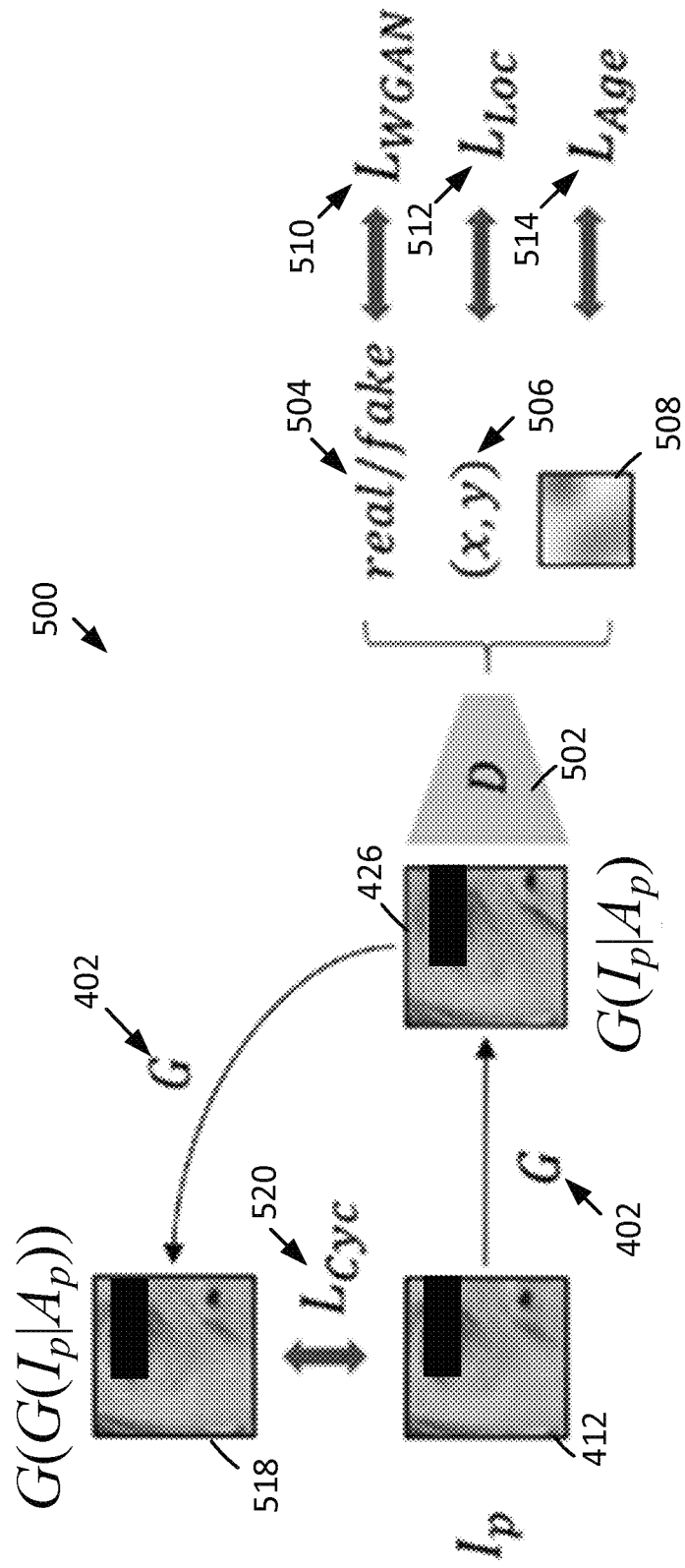

In an embodiment, FIGS. 4 and 5 present the patch-based training workflow 400 and 500, where FIG. 4 shows training a generator (G) 402 and FIG. 5 shows training a discriminator (D) 502 of a GANs-based model.

With reference to FIG. 4, generator (G) 402 comprises an encoder portion 402A and a decoder portion 402B where the decoder portion 402B configured with SPADE residual blocks to accommodate again maps and location thereof. Workflow operations 400 begin by cropping a patch from each of the image I (404), aging map A (406), and location maps X and Y (408, 410) to define image patch $I_p$ (412), aging map patch $A_p$ (414), and location maps $X_p$ and $Y_p$ (416, 418). The generator 402 transforms the image patch $I_p$ 412 according to the map 414 and location (maps 416, 418) via SPADE configuration 420 to produce an image Δp 422. As noted, the patch size may be 128×128, 256×256 or 512×512 pixels for training images of 1024×1024.

An attention mechanism 424 of [23] is used to force generator 402 to transform the image (patch 412) only where needed giving result $G(I_p|A_p)$ 426.

With reference to FIG. 5 and workflow operations 500, discriminator (D) 502 produces the real/fake output 504, the estimated location of the patch (x, y) 506, and the estimated aging map (508). These outputs (504, 506 and 508) are respectively penalized with the WGAN objective, location, and aging map loss functions (510, 512 and 516). The location and again map loss functions are further described.

The result 426 is used in the cycle GANs based model training to produce result G ($G(I_p|A_p)$ 518 from generator 402. The cycle consistency loss 520 ensures the transformation preserves the key features of the original image patch 412.

Aging Maps

In an embodiment, to avoid penalizing the model (e.g. a generator G) for failing to place the bounding boxes with pixel-precision, the aging maps are blurred to smooth the edges and compute the discriminator regression loss on downsampled 10×10 maps. This formulation allows packing the information in a more compact and meaningful way than as individual uniform feature maps [10, 28, 32, 33]. The approach only requires multiple feature maps when there are large overlaps between signs (e.g. forehead pigmentation and forehead wrinkles). In an embodiment, the general case for small overlaps is to have only one aging map with values being the average of the two signs in the overlap zone. If the zones were to overlap too much (forehead wrinkles VS forehead pigmentation for example), In an embodiment, the Aging map comprises two layers of aging maps (i.e. one aging map for the wrinkles and one for the pigmentation in this case).

Considering an image patch i and aging map patch a, the loss is given in Equation 2.

$$\mathcal{L}_{Age} = \mathbb{E}_i[\|a - D_{Age}(G(i,a))\|_2] \quad (2)$$

Location Maps

In an embodiment, two orthogonal gradients (location maps 416, 418) are used to help the generator 402 apply relevant aging transformations to a given patch (e.g. 412). The X, Y coordinates of the patch 412 could be given to the generator 402 as two numbers instead of linear gradients maps, but doing so would prevent the use of the model on the full-scale image as it would break its fully-convolutional nature. Considering an image patch i and aging map patch a located at coordinates (x, y), the loss is given in Equation 3.

$$\mathcal{L}_{Loc} = \mathbb{E}_i[\|(x,y) - D(G(i,a))\|_2] \quad (3)$$

Training

In an embodiment, the models are trained with the Adam [21] optimizer with $\beta_1=0$, $\beta_2=0.99$ and learning rates of $7\times10^{-5}$ for G and $2\times10^{-4}$ for D. Following the two timescale update rule [17], both models are updated at each step. Additionally, learning rates for both G and D are linearly decayed to zero over the course of the training. To enforce cycle-consistency, a perceptual loss of [31] is used with $\lambda_{Cyc}=100$. For the regression tasks, $\lambda_{Loc}=50$ is used to predict the (x,y) coordinates of the patch and $\lambda_{Age}=100$ to estimate the downsampled aging map. The discriminator is penalized with the original gradient penalty presented in [15] with $\lambda_{GP}=10$. The complete loss objective function is given in Equation 4:

$$\mathcal{L} = \mathcal{L}_{WGAN} + \lambda_{Cyc}\mathcal{L}_{Cyc} + \lambda_{Age}\mathcal{L}_{Age} + \lambda_{Loc}\mathcal{L}_{Loc} + \lambda_{GP}L_{GP}. \quad (4)$$

Inference

For inference, in an embodiment, the (generator) model G, as trained may be optimized for stability such as by determining an exponential moving average [29] over G's parameters to define a inference model G. The trained generator can be used directly on the 1024×1024 image no matter the size of the patch used during training due to the fully convolutional nature of the network and the use of continuous 2D aging maps.

In an embodiment, a target aging map is created manually. In an embodiment, the face landmarks and target scores are used to build a target aging map.

In an embodiment, a user is facilitated to enter a target aging in an application interface and the application is configured to define an aging map (and location map if necessary) with the target aging as the aging map values.

In an embodiment, instead of an absolute age, a user is facilitated to enter an age difference (e.g. a delta value for example to take 3 years off or add 10 years). In the embodiment, the application then analyzes a received image to determine apparent age or skin sign values and then defines an aging map relative to that analysis modifying the apparent age/skin sign values to suit the user request. The application is configured to use that map to define a modified image showing the aged image.

In an embodiment, a method (e.g. a computing device method) comprises:

Receiving a user provided "selfie" image;

Analyzing the image to generate "current" skin sign values; Automatic skin sign analysis is shown and described in U.S. Patent Pub. No. 2020/0170564A1 of Jun. 4, 2020 entitled "Automatic image-based diagnostics using deep learning", the entire contents of which is incorporated herein by reference;

Presenting (via a display device) the user with an annotated selfie that shows the user's analyzed skin signs overlaid on zones of the face related to the respective signs;

Receiving user input (via a graphical or other user interface) that adjusts one or more sign scores. By way of example, the input is a skin sign adjustment value (e.g. a target or a delta). By way of example, the input is a product and/or service selection that relates to a zone (or more than one). The product and/or service is associated with a skin sign score adjustment value (e.g. a delta).

Defining an aging map using the current skin sign score and the skin sign score adjustment value;

Using the map with generator G to define a modified image; and

Presenting the user (e.g. via the display device) with the modified image, by way of example, showing what the user may look like after use of the product and/or service.

Experiments

Experimental Setting

Most face aging datasets [9, 24, 25] suffer from a lack of diversity in terms of ethnicity [19], and focus on low-resolution images (up to 250×250 pixels). This isn't sufficient to capture fine details related to skin aging. Moreover, they often fail to normalize the pose and expression of the faces (smiling, frowning, raised eyebrows), which results in accentuated wrinkles unrelated to aging (mostly nasolabial wrinkles, crow's feet wrinkles, forehead wrinkles and wrinkles underneath the eye). Finally, the lack of fine-grained information on the aging signs causes other approaches to capture unwanted correlated features such as the fattening of the face, as observed in datasets such as IMDB-Wiki [25]. These effects can be observed in FIG. 6.

Figure 6:
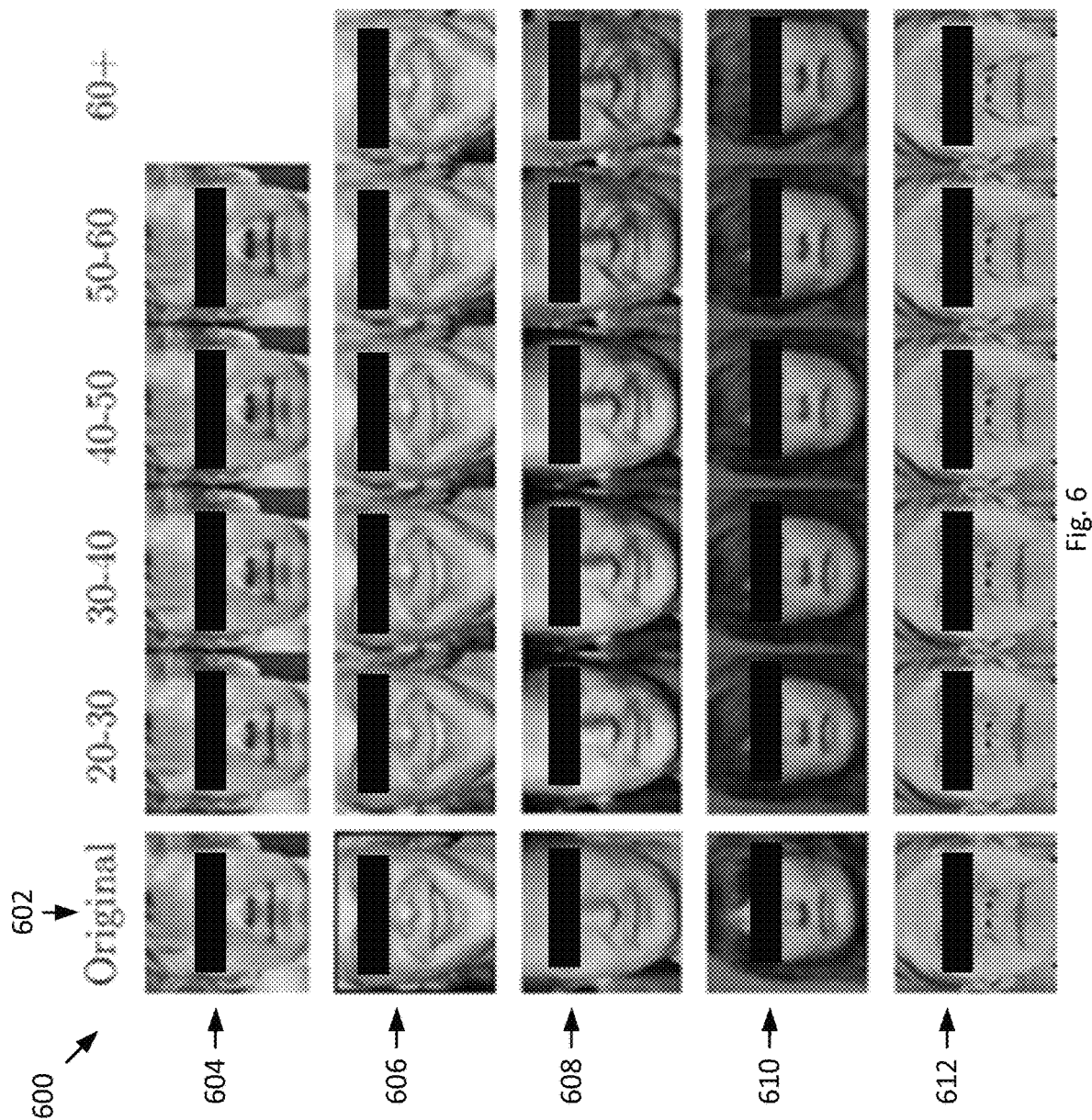
FIG. 6 is an array of aged images showing a comparison of aging according to prior approaches and an approach of an embodiment.

FIG. 6 shows an array of images 600 including an original image in a first column 602 and aged images in the remaining columns to illustrate a comparison of prior aging approaches and an approach of the current teaching herein. Images in accordance with the prior aging approaches are presented in rows 604, 606, 608 and 610 following [28], [16], [26], and [2] respectively. Images in accordance with an approach of the current teaching herein are presented in row 612.

Previous approaches operate on low-resolution images and suffer from a lack of wrinkles dynamic range, especially for expression wrinkles (row 604). They are also prone to color shifts and artifacts (606, 608 and 610), as well as unwanted correlated features such as the fattening of the face (610).

To address these issues, the models in accordance with the present teaching were tested on two curated high-resolution datasets, using manually generated aging maps or uniform aging maps to highlight the rejuvenation/aging.

FFHQ

Testing was performed using the FFHQ dataset [20]. In an embodiment, to minimize the issues in lighting, pose, and facial expressions, simple heuristics were applied to select a subset of the dataset of better quality. To do so, facial landmarks were extracted from all faces and used to remove all images where the head was too heavily tilted left, right, up or down. In addition, all images were removed with an open mouth to limit artificial nasolabial fold and underneath the eye wrinkles. Finally, a HOG [12] feature descriptor was used to remove images with hair covering the face. This selection brought down the dataset from 70 k+ to 10 k+ images. Due to the extreme diversity of the FFHQ dataset, the remaining images are still far from being perfect, especially in terms of lighting color, direction and exposure.

To obtain the scores of the individual aging signs on these images, in an embodiment, a aging sign estimation models based on the ResNet [27] architecture were used that were trained on a high-quality standardized dataset described herein below (i.e. 6000 high-resolution 3000×3000 images). Finally, the ground truth aging maps were generated using the landmarks as a basis for the coarse bounding-boxes. The model was trained on 256×256 patches randomly selected on the 1024×1024 face.

High-Quality Standardized Dataset

To obtain better performance, in an embodiment, a dataset of 6000 high-resolution (3000×3000) images of faces, centered and aligned, spanning most ages, genders, and ethnicities (African, Caucasian, Chinese, Japanese and Indian) was collected. The images were labeled using ethnicity-specific clinical aging sign atlases [4-7,13] and scored on signs covering most of the face (apparent age, forehead wrinkles, nasolabial fold, underneath the eye wrinkles, upper lip wrinkles, wrinkles at the corner of the lips and ptosis of the lower part of the face).

Results

FFHQ Dataset

Despite the complexity of the dataset, and without ground truth age values, the patch-based model is able to transform the individual wrinkles on the face in a continuous manner.

Figure 7:
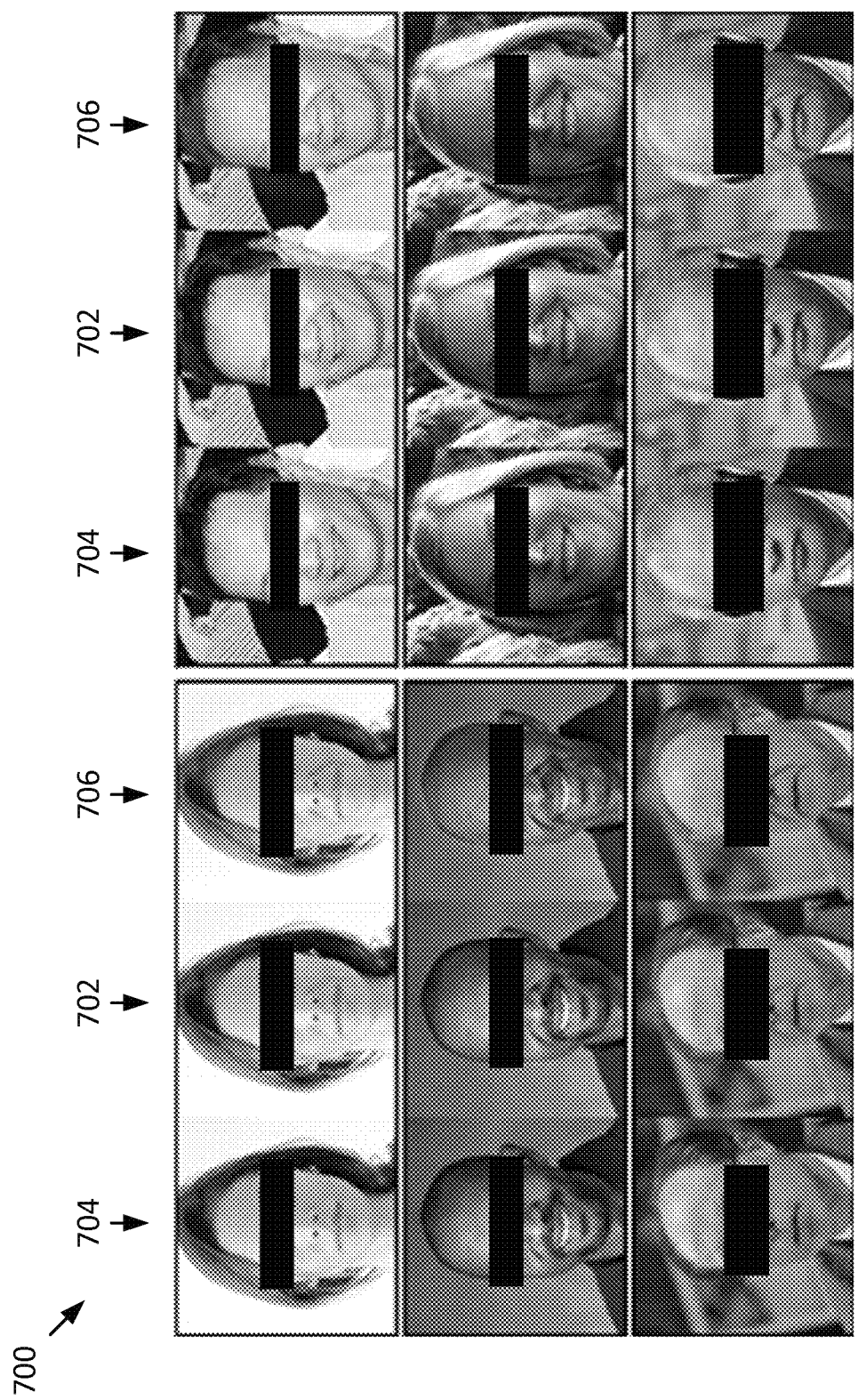
FIG. 7 is an array of images showing rejuvenation, original and aging of six faces of different ages and ethnicities from the FFHQ dataset using the approach of an embodiment.
Figure 8:
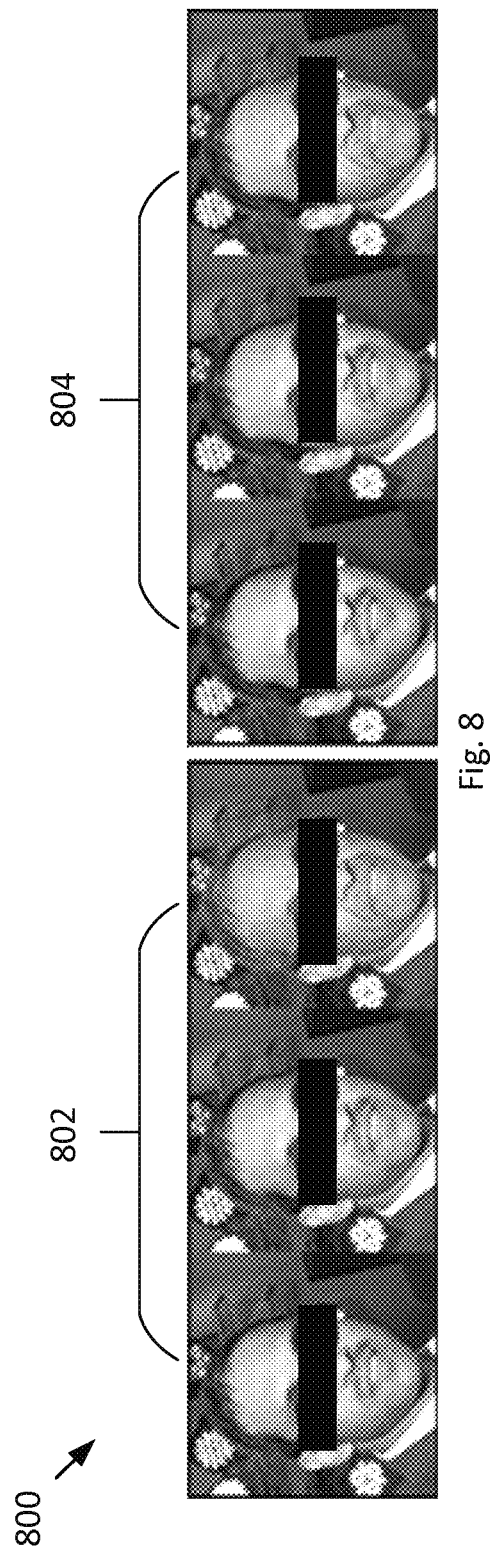
FIG. 8 is an array of images 800 showing model results in group 802 were no skin sign value is defined and in group 804 where skin sign values are defined according to an embodiment.

FIG. 7 is an array of images 700 showing original (columns 702) rejuvenation (columns 704), and aging (columns 706) images of six faces of different ages and ethnicities from the FFHQ dataset using an embodiment of the current teaching herein. FIG. 7 displays how the model was able to transform the different wrinkles despite the complexity of the patch-based training, the large variation in lighting in the dataset, and the unbalance between grades of clinical signs/age, with a vast majority of young subjects with few wrinkles. FIG. 8 is an array of images 800 showing model results in group 802 were no skin sign value is defined and in group 804 where skin sign values are defined according to an embodiment. Where no sign is defined, the map is filled with an age value. This assists the model to learn global features such as greying of the hair (group 802). Using individual clinical signs in an aging map allows us to age all signs but keep the appearance of the hair intact (group 804) highlights the control the model has over the individual signs, allowing aging the face in a controllable way that wouldn't be possible with the only label of the age.

High-Quality Standardized Dataset

Figure 9:
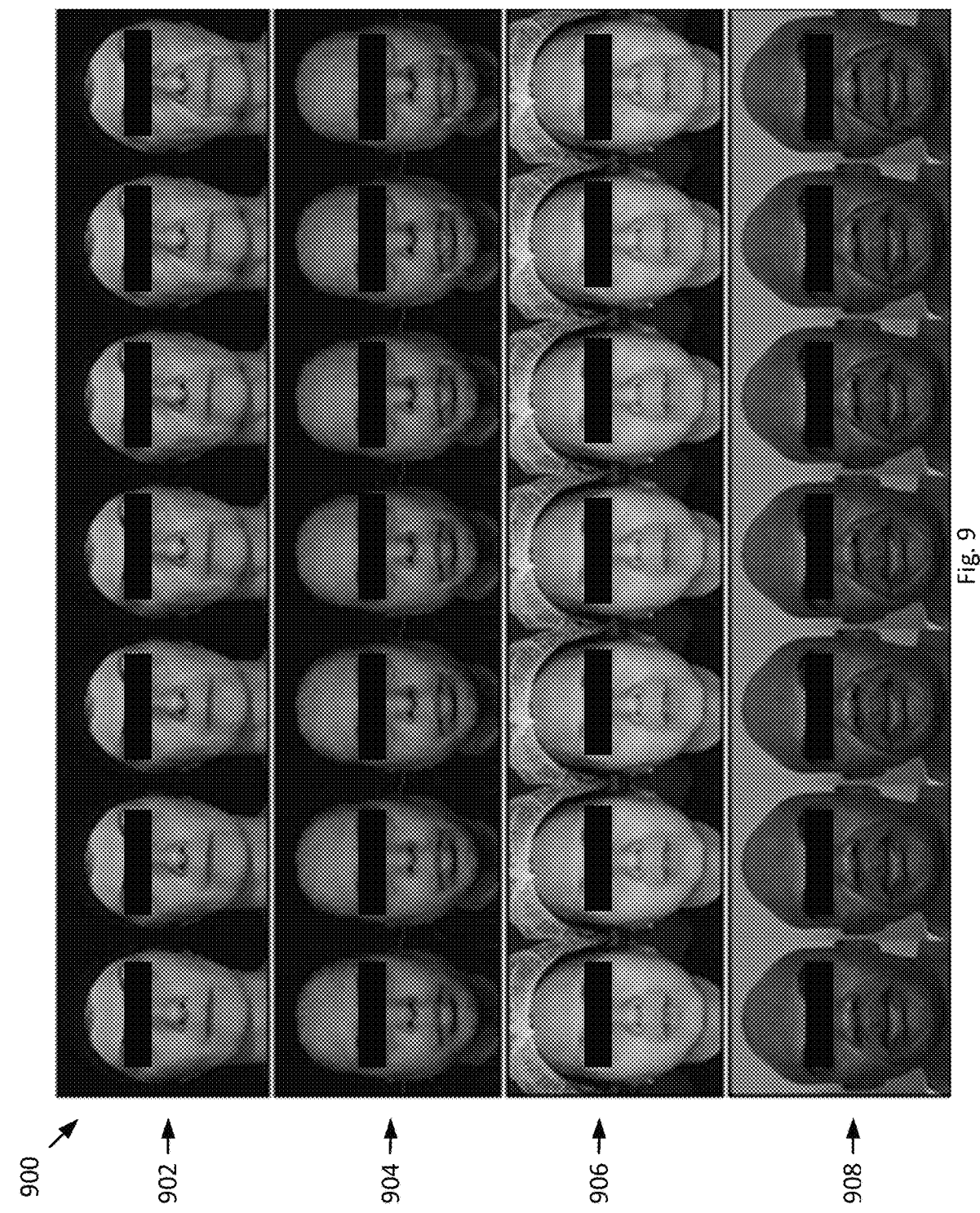
FIG. 9 is an array of images showing aging in a continuous manner in accordance with an embodiment.

On more standardized images, and with better coverage across ethnicity and aging sings, the model demonstrates state-of-the-art performance (FIG. 1, FIG. 9), with a high level of detail, realism, and no visible artifacts. By way of example, FIG. 9 is an array of images 900 showing aging of four faces in a continuous manner in rows 902, 904, 906 and 908 in accordance with an embodiment. No zone is left unchanged, even the forehead or the sagging of lower part of the face. The complementary age information used to fill the gap can be seen on the thinning or greying of the eyebrows.

Figure 10:
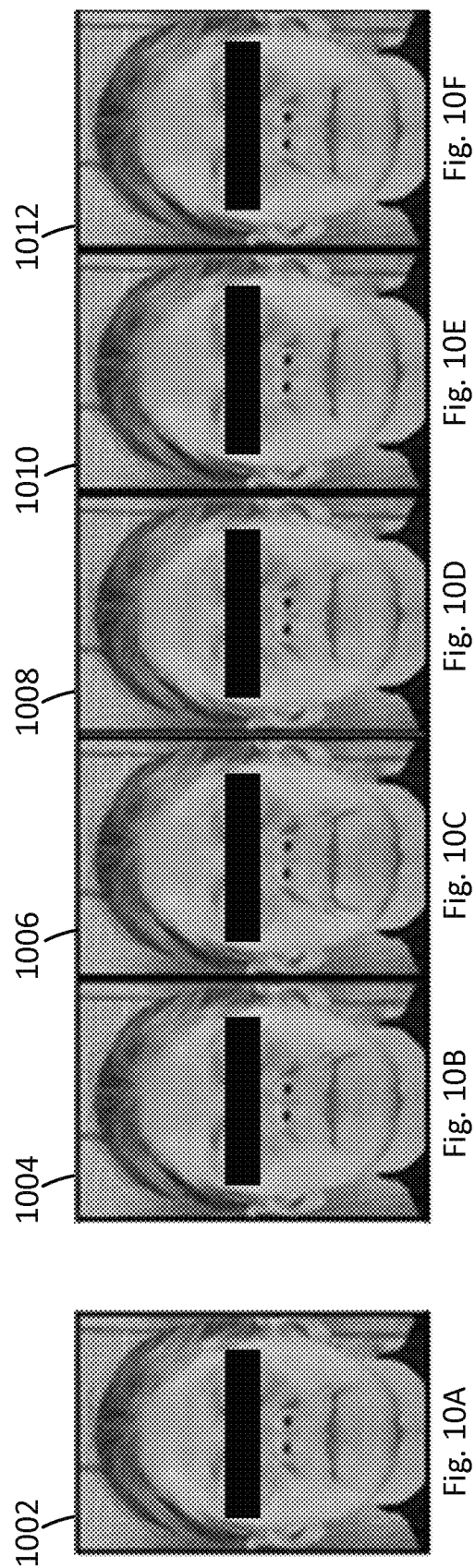
FIGS. 10A, 10B, 10C, 10D, 10E and 10F are images of a same face showing an original image and aged images using respective aging maps in accordance with an embodiment.

The aging process using the teaching herein is successful along the continuous spectrum of aging maps, allowing realistic images to be generated for a diverse set of sign severity values. This realistic and continuous aging using respectively defined aged maps is illustrated on a same face, in an embodiment, as shown in the examples of FIGS. 10A-10F. FIG. 10A shows an image 1002 of the face before aging is applied. FIG. 10B shows an image 1004 of the face aged via an aging map that rejuvenates all signs except for the nasolabial, corner of the lips and underneath the eyes wrinkles on the right part of the face. FIG. 10C shows an image 1006 where a map only aged the bottom of the face and FIG. 10D an image 1008 where a map only aged the top. FIG. 10E shows an image 1010 where a map was defined to only age the wrinkles underneath the eye. FIG. 10F shows an image 1012 for a map defined to age the face in an asymmetric fashion, namely the right wrinkles underneath the eyes and the left nasolabial fold.

Evaluation Metrics

To be considered successful, the task of face aging requires three criteria to be met: the image must be realistic, the identity of the subject must be preserved, and the face must be aged. These are respectively enforced during training thanks to the WGAN objective function, cycle-consistency loss and aging map estimation loss. By nature, one single metric couldn't ensure that all criteria are met. For instance, the model could leave the input image without altering it, and still succeed in realism and identity. Contrarily, the model could succeed in aging but fail realism and/or identity. If one metric isn't superior to another on every metric, a trade-off may be chosen.

Experiments on FFHQ and the high-quality standardized dataset never displayed any issue in the preservation of the subject identity. In an embodiment, it was chosen to focus on the realism and aging criteria for a quantitative evaluation. Because the approach herein focuses on aging as a combination of aging signs instead of relying solely on age, the accuracy of the target age is not used as a metric. Instead, Fréchet Inception Distance (FID) [17] is used to assess the realism of the images, and the Mean Average Error (MAE) for the accuracy of the target aging signs.

To do so, half of the dataset is used as a reference for real images, and the rest as the images to be transformed by the model. The aging maps used to transform these images are chosen randomly from the ground truth labels to ensure a distribution of generated images that follows the original dataset. The value of individual scores were estimated on all generated images using dedicated aging sign estimation models based on the ResNet [27] architecture. As a reference for the FID scores, the FID is computed between both halves of the real image dataset. Note that the size of the dataset prevents computing the FID on the recommended 50 k+[17, 20], thus leading to the overestimation of the value. This can be seen when computing the FID between real images only, giving a baseline FID of 49.0. The results are presented in Table 1.

TABLE 1

| Method | Patch Size | FID↓ | MAE↓ |
|---|---|---|---|
| AMGAN (Ours) | 512 × 512 | 110.1 | 0.14 |
| AMGAN (Ours) | 256 × 256 | 110.7 | 0.14 |
| w/o Aging Maps | 256 × 256 | 141.6 | 0.17 |
| AMGAN (Ours) | 128 × 128 | 112.9 | 0.17 |
| w/o Location Maps | 128 × 128 | 140.0 | 0.20 |
| Real Images | — | 49.0 | — |

Comparison Between Age and Clinical Signs

In an embodiment, when trained without clinical signs, using only the age to create a uniform aging map, the model still gives convincing results, with low FID and MAE on the criteria of estimated age. Table 2 thus shows Fréchet Inception Distance and Mean Average Error for the model with clinical signs, and with age only.

TABLE 2

| Method | Patch Size | Control | FID | MAE |
|---|---|---|---|---|
| AMGAN (Ours) | 256 × 256 | ✓ | 110.7 | 0.143 |
| w/o Clinical Signs | 256 × 256 | ✗ | 101.3 | 0.116 |

By comparing the aged faces with the age-only approach, however, it appears that some wrinkles don't exhibit their full range of dynamics for the age-only model. This is due to the fact that not all aging signs need to be maximized in order to reach the limit age of the dataset. In fact, the 150 oldest individuals of the standardized dataset (65 to 80 years old) display a median standard deviation of their normalized aging signs of 0.18, highlighting the many possible combinations of aging signs in old people. This an issue for the age-only model because it only offers one way to age a face. For example, signs such as the forehead wrinkles are highly dependent on the facial expressions of the subject and are integral parts of the aging process. By only looking at the age of subjects in the dataset, the distribution of these clinical aging signs cannot be controlled.

To the contrary, the faces aged, in an embodiment, with the aging map offer much more control over the aging process. By controlling each individual sign of aging, one can choose whether to apply these expression wrinkles or not. A natural extension of this benefit is the pigmentation of the skin, which is viewed in some Asian countries as a sign of aging. An age-based model cannot produce aging for these countries without having to re-estimate the age from the local perspective. This doesn't scale, unlike the disclosed approach herein which, once trained with every relevant aging sign, can offer a face aging experience customized to the point of view of different countries, all in a single model and without additional labels.

Ablation Study

Figure 11:
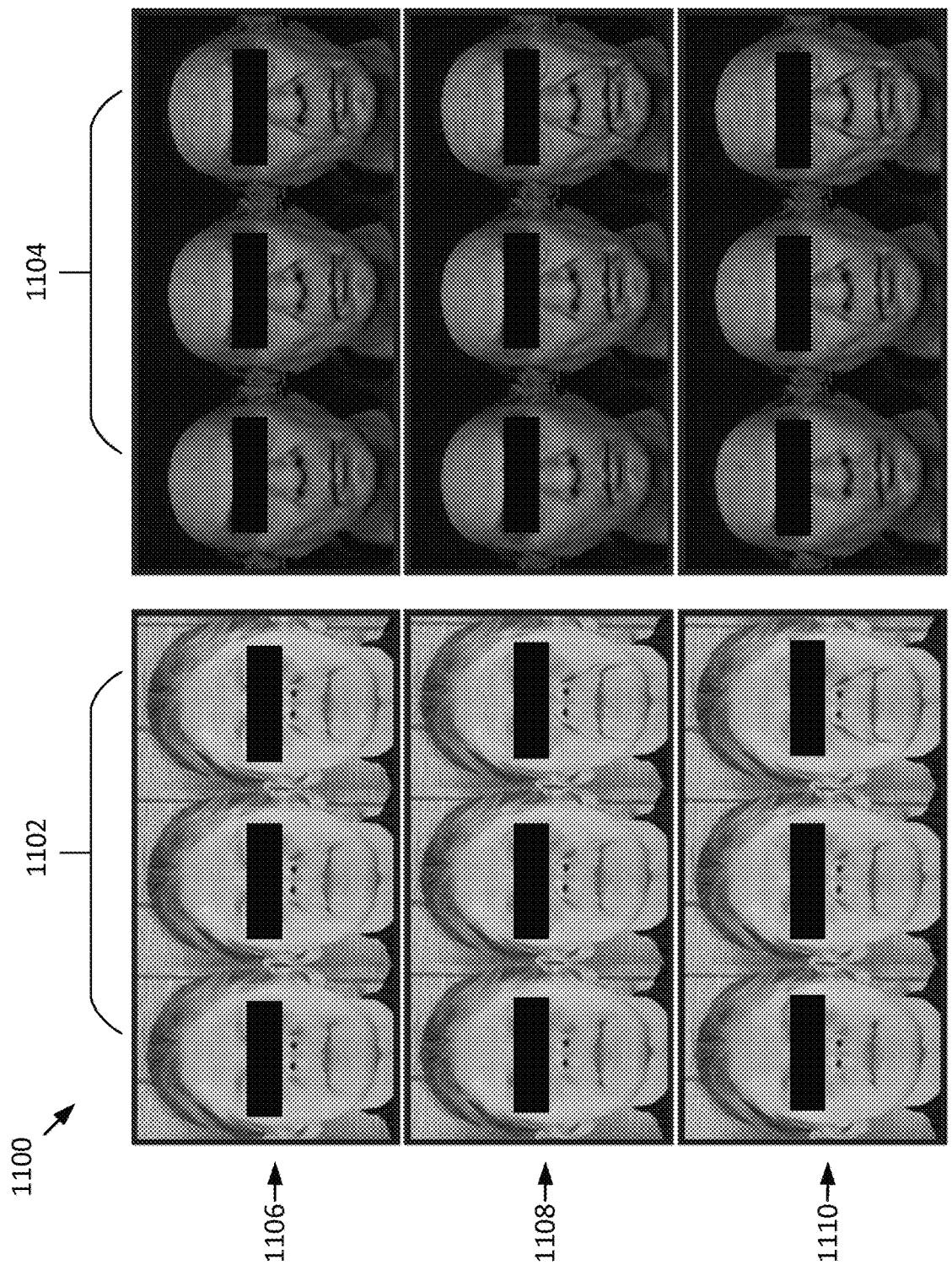
FIG. 11 shows two arrays of images for two respective faces showing rejuvenation results for one face and aging results for a second face using three different patch sizes on a 1024×1024 image in accordance with an embodiment.

Effect of Patch Size: When training the model, in an embodiment, for a given target image resolution (1024× 1024 pixels in the experiments), one can choose the size of the patch used for the training. The bigger the patch, the more context the model will have to perform the aging task. For the same computation power, however, larger patches cause the batch size to be smaller, which hinders the training [8]. Experiments were conducted using patches of 128×128, 256×256 and 512×512 pixels. FIG. 11 shows arrays of images 1100 showing rejuvenation and aging results on a 1024×1024 images of faces in accordance with a teaching herein. Arrays 1100 comprises a first array of images 1102 and a second array of images 1104 for two respective faces. Array 1102 shows rejuvenation results for one face and array 1104 shows aging results for a second face. The rows 1106, 1108 and 1110 show results using respective different patch sizes. Row 1106 shows 128×128 patch size, row 1108 shows 256×256 patch size and row 1110 shows 512×512 patch size.

FIG. 11 shows that all patch sizes manage to age the high-resolution face, in an embodiment, but to various degrees of realism. The smallest patch size suffers most from the lack of context and produces results that are inferior to the other two, with visible texture artifacts. The 256×256 patch gives convincing results, with minor imperfection only visible when compared to the 512×512 patch. These results suggest that application of the technique to larger resolutions, such as with patches of 512×512 on 2048×2048 images.

Figure 12:
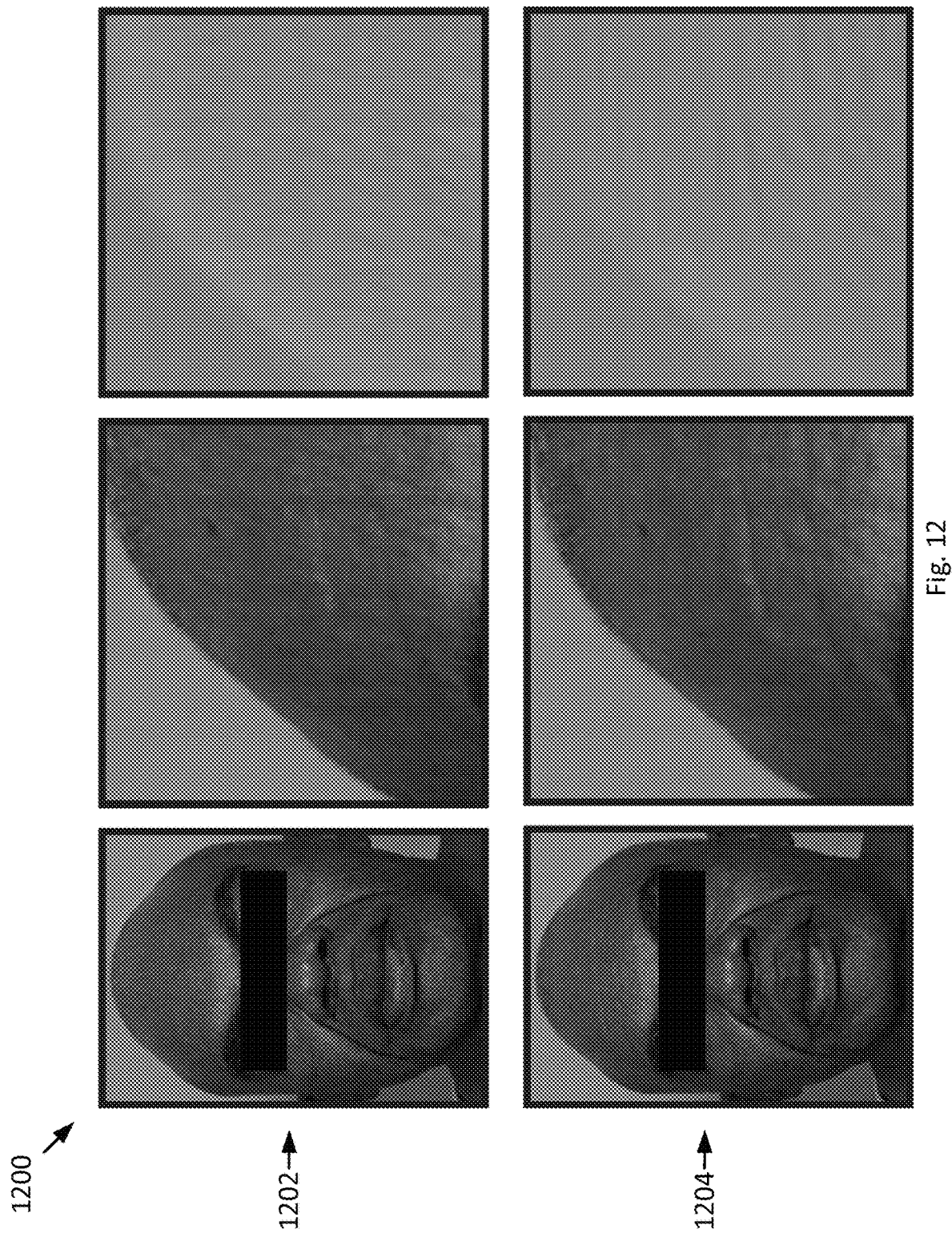
FIG. 12 shows arrays of images illustrating aging effects where the first array shows aging using a model (patch) trained without using location maps and the second array shows aging using a model (patch) trained with using location maps, where each model was trained following an embodiment.

Location Maps:

To see the contribution of the location maps, in an embodiment, a model was trained with and without them. As expected, the effect of the location maps is more prominent on small patch sizes, where the ambiguity is high. FIG. 12 shows how on small patch sizes and in the absence of location information, the model is unable to differentiate similar patches from different parts of the face. FIG. 12 shows arrays 1200 of images illustrating aging effects in two arrays 1202 and 1204 in accordance with two (patch trained) models following a teaching herein. FIG. 12 thus shows, in array 1202, a face aged with a smallest patch size without using location maps and, in array 1204, the face aged with the smallest patch size with using location maps. In each respective array the aged face is shown along with the difference with the original image. When (patch) trained without using location maps, the model is unable to add wrinkles that are coherent with the location, and generates generic diagonal ripples. This effect is less present on larger patch sizes because the location of the patch is less ambiguous. The location maps eliminate the presence of diagonal texture artifacts, especially on the forehead where they allow horizontal wrinkles to appear.

Figure 13:
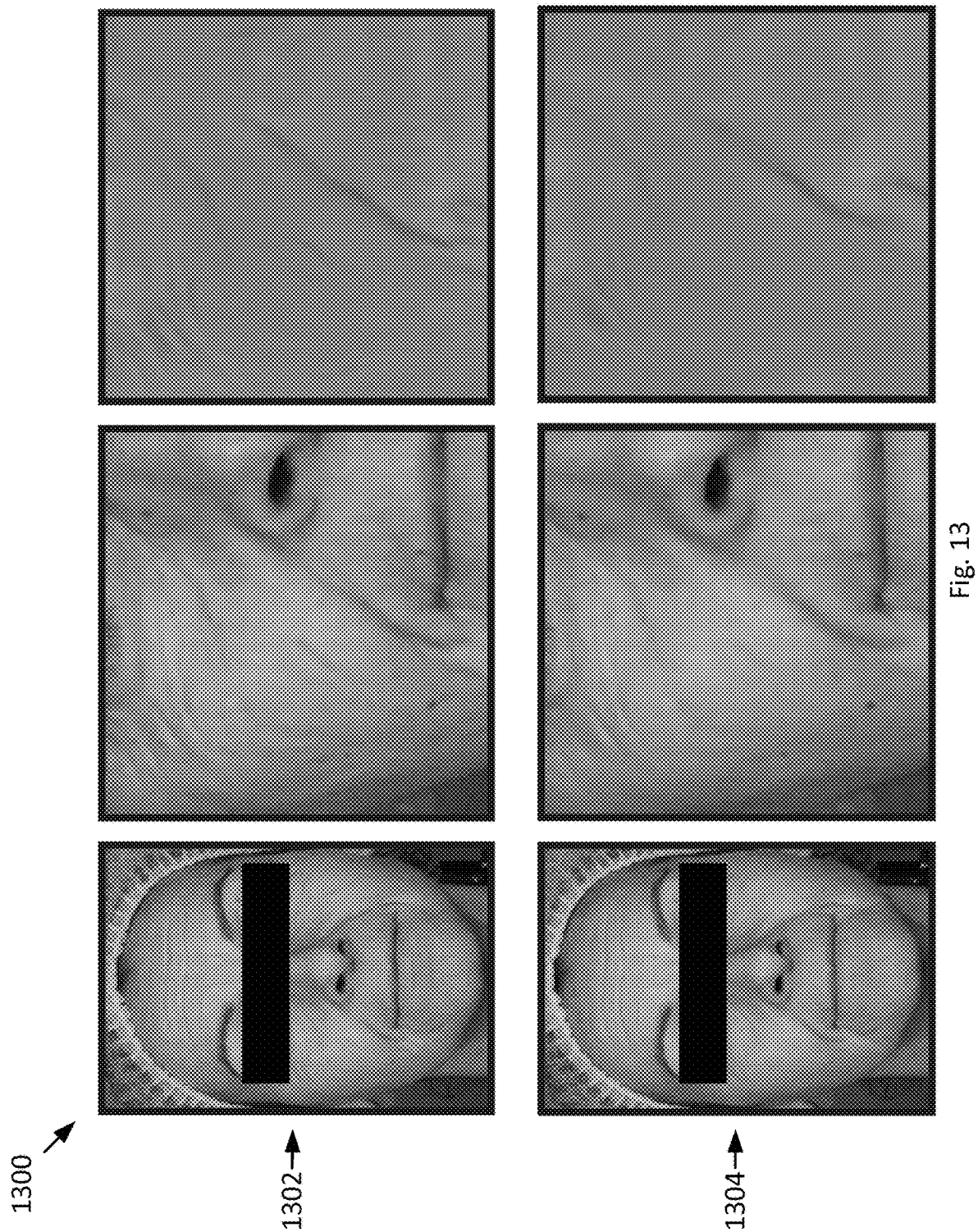
FIG. 13 shows arrays of images illustrating aging effects where the first array shows aging using a model (patch) trained using uniform feature maps and the second array shows aging using a model (patch) trained with aging maps in accordance with an embodiment.

Spatialization of Information:

The use of the proposed aging maps in accordance with a teaching herein was compared against a baseline method of formatting conditions, namely to give all sign scores as individual uniform feature maps. Since not every sign is present in a particular patch, especially when the patch size is small, most of the processed information is of no use to the model. The aging maps represent a simple way of only giving the model the labels present in the patch, in addition to their spatial extent and location. FIG. 13 highlights the effect of the aging map. FIG. 13 shows arrays 1300 of images illustrating aging effects where a first array 1302 shows aging using a model (patch) trained using uniform feature maps and a second array 1304 shows aging using a model (patch) trained with aging maps in accordance with a teaching herein.

On small or medium patches (e.g. 128×128 or 256×256 pixels), the model struggles to create realistic results. The aging map helps reduce the complexity of the problem. FIG. 13 thus shows, in array 1302 of three images and array 1304 of three images, a face aged with large patch size (e.g. 512×512 with individual uniform condition feature maps (array 1302) and proposed aging maps (array 1304), along with the difference with the original image in each respective array. Patch size need not be a factor of two of the original image size (e.g. 800×800 would be large without being the full size of the 1024×1024 image). The aging maps help make the training more efficient thanks to denser spatialized information, and produces more realistic aging. The difference highlights the small unrealistic wrinkles for the baseline technique.

Alternatively, in an embodiment, a different approach is used as shown in StarGAN, whereby the model is given all sign values for each patch, even the values of signs that are not present in the patch.

Application(s)

In an embodiment, disclosed technologies and methodologies include developer related methods and systems to define (such as through conditioning) a model having a generator for image to image translation that provides age simulation. The generator exhibits continuous control (over a plurality of age related skin signs) to create smooth transformations between an original image and a transformed image (e.g. of a face). The generator is trained using individual unpaired training images wherein each of the training images has an aging map identifying facial landmarks associated with respective age related skin signs to provide weak spatial supervision to guide the aging process. In an embodiment, the age related skin signs represent ethnic-specific dimensions of aging.

In an embodiment, GANs-based models having generators for image-to-image translation for age simulation are incorporated into a computer implemented method (e.g. an application) or computing device or system to provide a virtual reality, augmented reality and/or modified reality experience. An application is configured to facilitate a user to use a camera equipped smartphone or tablet, etc. to take a selfie image (or video) and a generator G applies the desired effect such as for playback or other presenting by the smartphone or tablet.

In an embodiment a generator G as taught herein is configured for loading and executing on commonly available consumer smartphones or tablets (e.g. target devices). An example configuration includes devices with the following hardware specification: Intel® Xeon® CPU E5-2686 v4@2.30 GHz, profiled with only 1 core and 1 thread. In an embodiment, the generator G is configured for loading and executing on a computing device with more resources including a server, desktop, gaming computer or other device such as having multiple cores and executing in multiple threads. In an embodiment, generator G is provided as a (cloud-based) service.

In an embodiment, in addition to developer (e.g. used at training time) and target (used at inference time) computing device aspects, a person of ordinary skill will understand that computer program product aspects are disclosed, where instructions are stored in a non-transient storage device (e.g. a memory, CD-ROM, DVD-ROM, disc, etc.) to configure a computing device to perform any of the method aspects disclosed herein.

Figure 14:
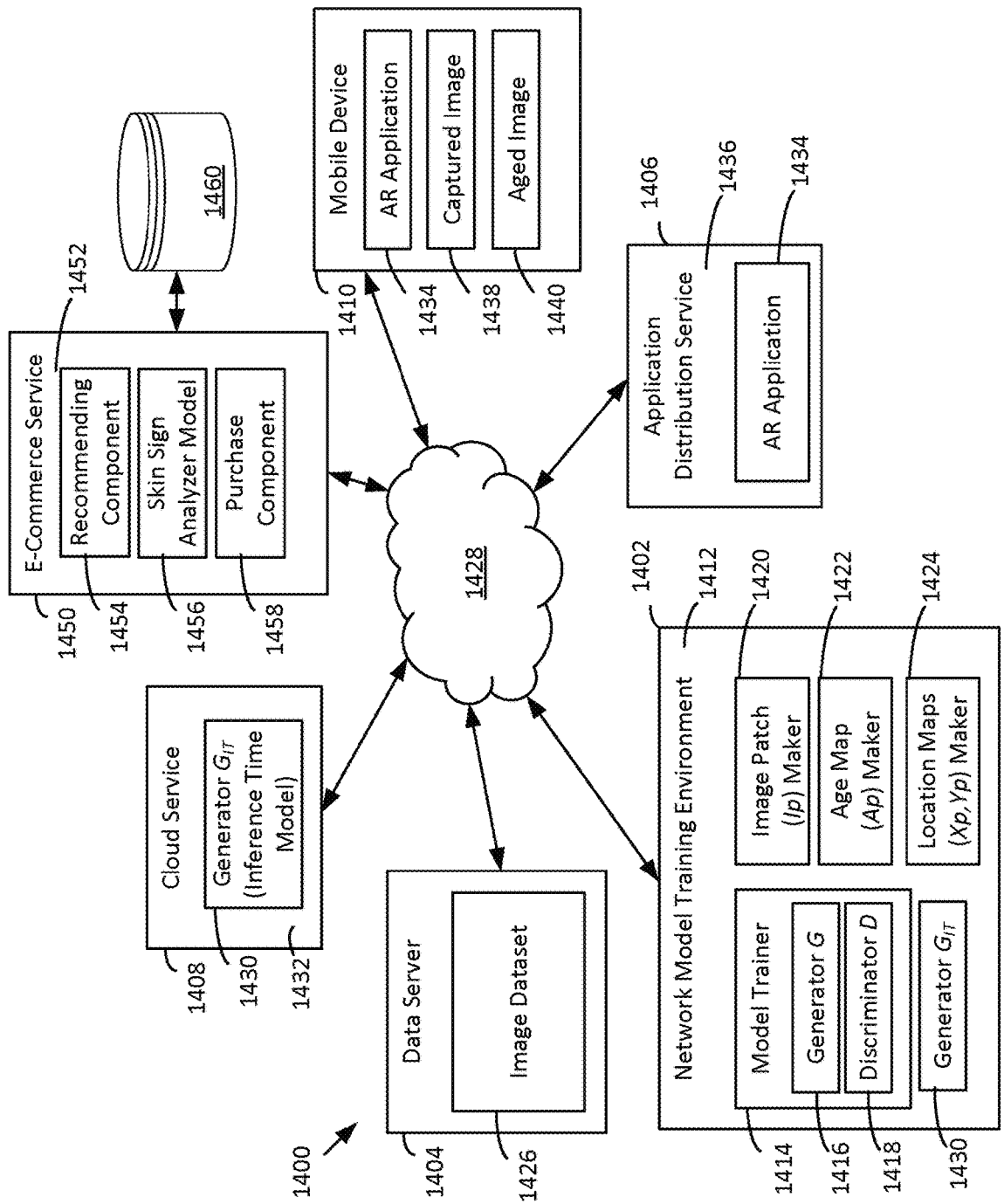
FIG. 14 is a block diagram of a computer system comprising a plurality of computing devices in accordance with an embodiment.

FIG. 14 is a block diagram of a computer system 1400, in accordance with an embodiment. Computer system 1400 comprises a plurality of computing devices (1402, 1406, 1408, 1410 and 1450) which include servers, developer computers (PCs, laptops, etc.) and typical user computers (e.g. PCs, laptops, and smaller form factor (personal) mobile devices such as smartphones and tablets, etc.). In the embodiment, computing device 1402 provides a network model training environment 1412 comprising hardware and software, in accordance with a teaching herein, to define a model for image-to-image translation providing continuous aging. Components of network model training environment 1412 include a model trainer component 1414 to define and configure, such as through conditioning, a model comprising a generator G 1416 and a discriminator D 1418. Generator G is useful to define a model for use at inference to perform image to image translation, whereas discriminator D 1418 is a construct for training, as is well known.

In the embodiment, the conditioning is performed such as in accordance with the training workflows of FIGS. 4 and 5. The workflow uses patch training of high resolution images (e.g. 1024×1024 or higher pixel resolution). The training uses skin sign values or apparent age for same for respective zones of the face where such skin signs are located. Dense, spatialized information for these features are provided such as by using aging maps. In the embodiment, the location of the patch is provided, for example, to avoid ambiguities and differentiate similar patches from different parts of a face, using location information. In the embodiment, to achieve fully convolutional processing, location information is supplied using gradient location maps for (x,y) coordinates within the training image. In the embodiment, the model and discriminator have the form, provide the outputs and are conditioned using the objective functions (e.g. loss functions) described herein above.

In the embodiment, as training uses patches, aging maps and locations maps, further components of environment 1412 comprise an image patch (Ip) maker component 1420, an aging map (Ap) maker component 1422 and a location maps (Xp, Yp) maker component 1424. Other components are not shown. In the embodiment, a data server (e.g. 1404) or other form of computing device stores an image dataset 1426 of (high resolution) images for training, and other purposes etc. and be coupled through one or more networks, representatively shown as network 1428, which network 1428 couple any of the computing devices 1402, 1404, 1406, 1408 and 1410. Network 1428 are, by way of example, wireless or otherwise, public or otherwise, etc. It will also be understood that system 1400 is simplified. At least any of the services may be implemented by more than one computing device.

Once trained, generator 1416 may be further defined as desired and provided as an inference time model (generator $G_{IT}$) 1430. According to the techniques and methodologies herein, in embodiments, the interference time model (generator $G_{IT}$ 1430) is made available for use in different ways. In one way in an embodiment, such as is shown in FIG. 14, generator $G_{IT}$ 1430 is offered as a cloud service 1432 or other software as a service (SaaS) offering via a cloud server 1408. A user application such as an augmented reality (AR) application 1434 is defined for use with the cloud service 1432 providing an interface to generator $G_{IT}$ 1430. In an embodiment, AR application 1434 is provided for distribution (e.g. via download) from an application distribution service 1436 provided by a server 1406.

Though not shown, in an embodiment, AR application 1434 is developed using an application developer computing device for particular target devices having particular hardware and software, particularly operating system configuration, etc. In an embodiment, AR application 1434 is a native application configured for execution in a specific native environment such as one defined for a particular operating system (and/or hardware). Native applications are often distributed through an application distribution service 1436 that is configured as an e-commerce "Store" operated by a third party service), though this is not necessary. In an embodiment, the AR application 1420 is a browser-based application, for example, configured to execute in a browser environment of the target user device.

AR application 1434 is provided for distribution (e.g. downloading) by user devices such as a mobile devices 1410. In an embodiment, AR application 1434 is configured to provide an augmented reality experience (for example via an interface) to a user. For example, an effect is provided to an image via processing by the inference time generator 1430. The mobile device has a camera (not shown) to capture an image (e.g. captured image 1438) which, In an embodiment, is a still image, comprising a selfie image. An effect is applied to the captured image 1438 using image processing techniques providing image to image translation. An aged image 1440 is defined and displayed on a display device (not shown) of the mobile device 1410 to simulate the effect on the captured image 1438. The position of the camera may be changed and the effect applied in response to further captured image(s) to simulate the augmented reality. It will be understood that the captured image defines a source or original image and the aged image defines a translated or transformed image or an image to which an effect is applied.

In the present cloud service paradigm of the present embodiment of FIG. 14, the captured image 1438 is provided to cloud service 1432 where it is processed by generator $G_{IT}$ 1430 to perform image to image translation with continuous aging to define aged image 1440. The aged image 1440 is communicated to mobile device 1440 for display, saving, sharing, etc.

In an embodiment, AR application 1434 provides an interface (not shown), for example, a graphical user interface (GUI) which may be voice enabled, for operating the AR application 1434. The interface is configured to enable image capture, communication with the cloud service, and display, saving and/or sharing of the translated image (e.g. aged image 1440). In an embodiment, the interface is configured to enable a user to provide inputs for the cloud service, such as to define an aging map. As noted previously, in an embodiment, the input comprises a target age. As noted previously, in an embodiment, the input comprises an age delta. As noted previously, in an embodiment the input comprises a product/service selection.

In the embodiment of FIG. 14 AR application 1434 or another (not shown) provides access (e.g. via communication) to a computing device 1450 providing an e-commerce service 1452. E-commerce service 1452 comprises a recommendation component 1454 to provide (personalized) recommendations for a product, service or both. In the embodiment such product and/or service is an anti-aging or rejuvenation product and/or service, etc. In the embodiment such product and/or service is associated with specific skin signs for example. A captured image from device 1410 is provided to e-commerce service 1452. A skin sign analysis is performed such as by a skin sign analyzer model 1456 using deep learning according to an embodiment. Image processing using a trained model analyzes the skin (e.g. zones of the face associated with the specific skin signs) to generate a skin analysis comprising scores for at least some of the skin signs. The value of individual scores may be generated on an image using (dedicated) aging sign estimation models (e.g. a type of classifier) based on the ResNet [27] architecture, for example, such as previously described for analyzing training set data.

In the embodiment, the skin signs (e.g. scores thereof) are used to generate personalized recommendations. For example a respective product (or service) is associated to one or more skin signs and to particular scores (or ranges of scores) for such signs. In the embodiment, information is stored in a database (e.g. 1460) for use by e-commerce service 1452 such as via appropriate look-ups matching a user's data to the product and/or service data. In an embodiment, rules-based matching may be utilized to select a product or products and/or to rank products/services associated to particular scores (or ranges of scores) for such signs. In an embodiment, further user data for use by the recommendation component 1454 comprises any of gender, ethnicity and location data, etc. For example, location data may be relevant to select any of a product/brand, formulation, regulatory requirement, format (e.g. size, etc.), labelling, SKU (stock keeping unit) available for or otherwise associated with the location of the user. In an embodiment, any of such gender, ethnicity and/or location data may also assist to select and/or rank selected products/services or filter products/services (e.g. remove a product/service that is not sold at or for a location). In an embodiment, location data is used to determine an available retailer/service provider (e.g. with physical business locations (e.g. a store, a salon, an office, etc.) or not) so that the user may purchase the product/service locally.

In the embodiment, skin sign scores of a user's captured image are provided from e-commerce service to display via AR application 1434 such as in the AR application interface. In the embodiment, skin sign scores are used to define an aging map for providing to cloud service 1432 for use by generator $G_{IT}$ 1430 to define a translated image. For example, In the embodiment, skin sign scores generated by model 1456 are used as originally generated from an image to define aging map values for some skin signs. Other skin sign scores as originally generated are e modified to define aging map values for some skin signs. In the embodiment, for example, a user may modify some scores as generated via the interface (e.g. skin signs around the eyes only). For example, in an embodiment, other means are used to modify the scores such as by application of a rule or other code. In the embodiment, modification is performed to represent rejuvenation of selected skin signs, or aging or any combination. Apparent age values in place of skin sign scores may be used for some skin signs as previously described.

In an embodiment, which is not to be limiting, a user receives a personalized product recommendation such as one recommended by e-commerce service 1452. The user selects a particular product or service. The selection thereof invokes a modification of a skin sign score for the user for an associated skin sign linked to the product or service. The modification adjusts a score to simulate a use of the product or service. The skin sign scores, as originally generated or as modified, are used in an aging map and provided to cloud service 1432 to receive an aged image. As described previously herein, skin sign scores for different signs may be combined in a map and the generator $G_{IT}$ is capable to age different signs differently. Thus, in the embodiment, an aging map is defined where some skin sign scores are as originally generated for some signs while other signs have modified scores.

In the embodiment of FIG. 14, e-commerce service 1452 is configured with a purchase component 1458 such as to facilitate the purchase of a product or service. Products or services comprise cosmetic products or services or others. Though not shown, e-commerce service 1452 and/or AR application 1434 provide images processing of a captured image to simulate a cosmetic product or services such as the application of makeup to a captured image producing an image to which an effect is applied.

Though captured images are used in the above described embodiments as source images for processing, in an embodiment, other source images (e.g. from other sources than a camera of device 1410) are used. An embodiments may use a captured image or other source image. Whether a captured image or another image, in an embodiment, such images high resolution images to improve the user experience as the model of generator $G_{IT}$ 1430 is trained for same. Though not shown, in the embodiment, images used by a skin sign analyzer model are downscaled when analyzed. Other image pre-processing is performed for such analysis.

In an embodiment, AR application 1434 may direct the user in respect of the quality features (viz. lighting, centering, background, hair occlusion, etc.) to improve performance. In an embodiment, AR application 1434 rejects an image if it does not meet certain minimum requirements and is unsuitable.

While shown as a mobile device in FIG. 14, in an embodiment, the computing device 1410 may have a different form factor, as stated. Rather (or in addition to) providing generator $G_{IT}$ 1430 as a cloud service, it may be hosted and executed locally to a particular computing device having sufficient storage and processing resources.

Thus, in an embodiment, there is provided a computing device (for example, device 1402, 1408 or 1410) comprising: a processing unit configured to: receive an original image of a face and use an age simulation generator to generate a translated image for presenting; wherein the generator simulates aging with continuous control over a plurality of age related skin signs between the original image and the translated image of the face, the generator configured to translate the original image using respective aging targets for the skin signs. It will be understood that such a computing device (for example, device 1402, 1408 or 1410) is configured to perform a related method aspect in accordance with an embodiment, for example, as described with reference to FIG. 15. It will be understood that embodiments of such computing device aspects have corresponding method aspect embodiments. Similarly, computing device and method aspects have corresponding computer program product aspects. A computer program aspect comprises a (e.g. non-transitory) storage device storing instructions, which instructions when executed by a processor of a computing device, configure the computing device to perform a method such as in accordance with any respective embodiment herein.

In an embodiment, the generator is conditional GANs-based. In an embodiment, the targets are provided to the generator as an aging map identifying zones of the face associated with respective ones of the skin signs, where each zone in the aging map is filled with a respective aging target corresponding to the associated skin sign. In an embodiment, the aging map represents a particular aging target for the associated skin sign by a score value of the associated skin sign. In an embodiment, the aging map represents a particular aging target for the associated skin sign by an apparent age value for the associated skin sign. In an embodiment, the aging map represents a particular aging target for the associated skin sign by a score value of the associated skin sign, when available, and an apparent age value when the score value is not available. In an embodiment, the aging map is defined to use pixel intensity to represent the aging targets.

In an embodiment, the aging map masks out a background of the original image.

In an embodiment, the generator is configured through training using respective training images and associated aging maps and wherein the associated aging maps provide weak spatial supervision to guide the aging transformations of the respective skin signs. In an embodiment, the skin signs represent ethnic-specific dimensions of aging. In an embodiment, the skin signs represent one or more of "age", "forehead wrinkles", "nasolabial fold", "wrinkles underneath the eye", glabellar wrinkles", "inter ocular wrinkles", "corner lips wrinkles", "upper lip" and "ptosis of the lower part of the face".

In an embodiment, the generator is a fully convolutional encoder-decoder comprising residual blocks in the decoder to incorporate the aging targets in the form of aging maps. In an embodiment, the generator is configured using a patch-based training using a portion of a particular training image and a corresponding patch of an associated aging map. In an embodiment, the residual blocks further incorporate location information to indicate a respective location of the portion of the particular training image and the corresponding patch of the associated aging map. In an embodiment, the location information is provided using respective X and Y coordinate maps defined from a horizontal gradient map and a vertical gradient map related to a height and width (H×W) size of the original image. In an embodiment, the particular training image is a high resolution image and a patch size is a portion thereof. In an embodiment, the patch size is ½ or less of the high resolution image.

In an embodiment, the generator is configured via an attention mechanism to limit the generator to transforming the age related skin signs while minimizing additional transformations to be applied.

In an embodiment, the processing unit (e.g. of device 1410) is configured to communicate with a second computing device (e.g. 1408) that provides the generator for use, the processing unit communicating the original image and receiving the translated image.

In an embodiment, the original image is a high resolution image of 1024×1024 pixels or higher.

In an embodiment, the processing unit (e.g. of computing device 1410) is further configured to provide an augmented reality application to simulate aging using the translated image. In an embodiment, the computing device comprises a camera and wherein the processing unit receives the original image from the camera.

In an embodiment, the processing unit is configured to provide at least one of: a recommendation function recommending at least one of a product and service and an e-commerce function with which to purchase at least one of a product and a service. The operation of "providing" in this context, in an embodiment, comprises communicating with a web-based or other network based service offered by another computing device (e.g. 1450) to facilitate the recommending and/or purchasing.

In an embodiment, the product comprises one of a rejuvenation product, an anti-aging product, and a cosmetic make-up product.

In an embodiment, the service comprises one of a rejuvenation service, an anti-aging service, and a cosmetic service.

Figure 15:
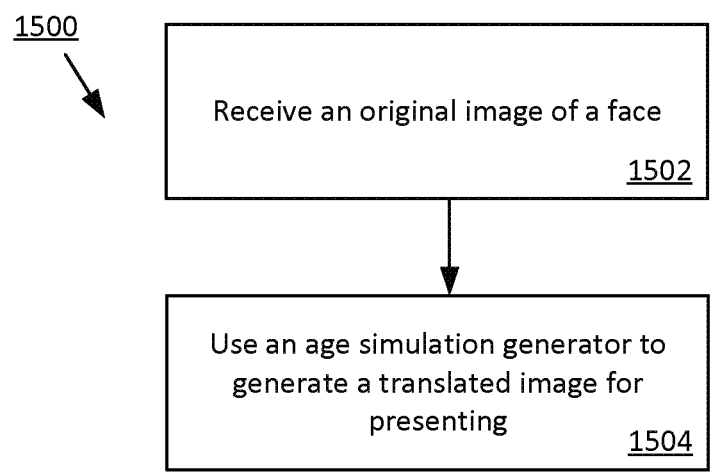
FIG. 15 is a flowchart of operations of a method aspect in accordance with an embodiment.

FIG. 15 is a flow chart of operations 1500 of a method aspect, in accordance with an embodiment, for example as performed by a computing device 1402 or 1408. At step 1502, operations receive an original image of a face and at step 1504 use an age simulation generator to generate a translated image for presenting; wherein the generator simulates aging with continuous control over a plurality of age related skin signs between the original image and the translated image of the face, the generator configured to translate the original image using respective aging targets for the skin signs. As noted embodiments of the related computing device aspect have corresponding method embodiments.

In an embodiment, the network model training environment provides a computing device configured to perform a method such as a method to configure by conditioning a (GANs-based) age simulation generator. In an embodiment, the method comprises: defining an age simulation generator having continuous control over a plurality of age related skin signs between an original image and a transformed image of a face, wherein defining comprises training the generator using individual unpaired training images wherein each of the training images is associated with an aging target for at least some of the skin signs; and providing the generator for translating images.

In an embodiment, the generator is conditional GANs-based.

In an embodiment, the method comprises defining the aging target as an aging map identifying zones of the face associated with respective ones of the skin signs, where each zone in the aging map is filled with a respective aging target corresponding to the associated skin sign.

In an embodiment, there is provided a computing device comprising a face-effect unit including processing circuitry configured to apply at least one facial effect to a source image and to generate a virtual instance of an applied-effect source image on an interface, the face-effect unit utilizing a generator to simulate aging with continuous control over a plurality of age related skin signs between the original image and the translated image of the face, the generator configured to translate the original image using respective aging targets for the skin signs. In an embodiment the interface is an e-commerce interface e.g. to enable purchase or a product/service.

In an embodiment the computing device comprises a recommendation unit including processing circuitry configured to present a recommendation of a product and/or service, and receive a selection of the product and/or service, wherein the product and/or service is associated with an aging target modifier for at least one of the skin signs. In an embodiment the interface is an e-commerce interface e.g. to enable purchase of the recommended product/service. The face-effect unit is configured to generate the respective aging targets for the skin signs using the aging target modifier in response to the selection thereby to simulate an effect of the product and/or service on the source image. In an embodiment, the recommendation unit is configured to obtain the recommendation by: invoking a skin sign analyzer to determine current skin sign scores using the source image; and using the current skin sign scores to determine the product and/or service. In an embodiment, the skin sign analyzer is configured to analyze the source image using a deep learning model. In an embodiment, the aging targets are defined from the current skin sign scores and the aging target modifier.

CONCLUSION

In this disclosure, there is presented the use of clinical signs to create aging maps for face aging. There is demonstrated state-of-the-art results on high-resolution images with complete control over the aging process. In an embodiment, the patch-based approach allows conditional GANs to be trained on large images while keeping a large batch size.

Practical implementation may include any or all of the features described herein. These and other aspects, features and various combinations may be expressed as methods, apparatus, systems, means for performing functions, program products, and in other ways, combining the features described herein. A number of embodiments have been described. Nevertheless, it will be understood that various modifications can be made without departing from the spirit and scope of the processes and techniques described herein. In addition, other steps can be provided, or steps can be eliminated, from the described process, and other components can be added to, or removed from, the described systems. Accordingly, other embodiments are within the scope of the following claims.

Throughout the description and claims of this specification, the word "comprise" and "contain" and variations of them mean "including but not limited to" and they are not intended to (and do not) exclude other components, integers or steps. Throughout this specification, the singular encompasses the plural unless the context requires otherwise. In particular, where the indefinite article is used, the specification is to be understood as contemplating plurality as well as singularity, unless the context requires otherwise.

Features, integers, characteristics, or groups described in conjunction with a particular aspect, embodiment or example of the invention are to be understood to be applicable to any other aspect, embodiment or example unless incompatible therewith. All of the features disclosed herein (including any accompanying claims, abstract and drawings), and/or all of the steps of any method or process so disclosed, may be combined in any combination, except combinations where at least some of such features and/or steps are mutually exclusive. The invention is not restricted to the details of any foregoing examples or embodiments. The invention extends to any novel one, or any novel combination, of the features disclosed in this specification (including any accompanying claims, abstract and drawings) or to any novel one, or any novel combination, of the steps of any method or process disclosed.

1. Agustsson, E., Timofte, R., Escalera, S., Baro, X., Guyon, I., Rothe, R.: Apparent and real age estimation in still images with deep residual regressors on appareal database. In: 2017 12th IEEE International Conference on Automatic Face & Gesture Recognition (FG 2017). pp. 87-94. IEEE (2017)
2. Antipov, G., Baccouche, M., Dugelay, J. L.: Face aging with conditional generative adversarial networks. In: 2017 IEEE international conference on image processing (ICIP). pp. 2089-2093. IEEE (2017)
3. Arjovsky, M., Chintala, S., Bottou, L. Wasserstein gan. arXiv preprint arXiv:1701.07875 (2017)
4. Bazin, R., Doublet, E.: Skin aging atlas. volume 1. caucasian type. MED'COM publishing (2007)
5. Bazin, R., Flament, F.: Skin aging atlas. volume 2, asian type (2010)
6. Bazin, R., Flament, F., Giron, F.: Skin aging atlas. volume 3. afro-american type. Paris: Med'com (2012)
7. Bazin, R., Flament, F., Rubert, V.: Skin aging atlas. volume 4, indian type (2015)
8. Brock, A., Donahue, J., Simonyan, K.: Large scale gan training for high fidelity natural image synthesis. arXiv preprint arXiv:1809.11096 (2018)
9. Chen, B. C., Chen, C. S., Hsu, W. H.: Cross-age reference coding for age-invariant face recognition and retrieval. In: European conference on computer vision. pp. 768-783. Springer (2014)
10. Choi, Y., Choi, M., Kim, M., Ha, J. W., Kim, S., Choo, J.: Stargan: Unified generative adversarial networks for multi-domain image-to-image translation. In: Proceedings of the IEEE conference on computer vision and pattern recognition. pp. 8789-8797 (2018)
11. Choi, Y., Uh, Y., Yoo, J., Ha, J. W.: Stargan v2: Diverse image synthesis for multiple domains. arXiv preprint arXiv:1912.01865 (2019)
12. Dalal, N., Triggs, B.: Histograms of oriented gradients for human detection. In: 2005 IEEE computer society conference on computer vision and pattern recognition (CVPR'05). vol. 1, pp. 886-893. IEEE (2005)
13. Flament, F., Bazin, R., Qiu, H.: Skin aging atlas. volume 5, photo-aging face & body (2017)
14. Goodfellow, I., Pouget-Abadie, J., Mirza, M., Xu, B., Warde-Farley, D., Ozair, S., Courville, A., Bengio, Y.: Generative adversarial nets. In: Advances in neural information processing systems. pp. 2672-2680 (2014)
15. Gulrajani, I., Ahmed, F., Arjovsky, M., Dumoulin, V., Courville, A. C.: Improved training of wasserstein gans. In: Advances in neural information processing systems. pp. 5767-5777 (2017)
16. Heljakka, A., Solin, A., Kannala, J.: Recursive chaining of reversible image-to-image translators for face aging. In: International Conference on Advanced Concepts for Intelligent Vision Systems. pp. 309-320. Springer (2018)
17. Heusel, M., Ramsauer, H., Unterthiner, T., Nessler, B., Hochreiter, S.: Gans trained by a two time-scale update rule converge to a local nash equilibrium. In: Advances in neural information processing systems. pp. 6626-6637 (2017)
18. Isola, P., Zhu, J. Y., Zhou, T., Efros, A. A.: Image-to-image translation with conditional adversarial networks. In: Proceedings of the IEEE conference on computer vision and pattern recognition. pp. 1125-1134 (2017)
19. Kärkkäinen, K., Joo, J.: Fairface: Face attribute dataset for balanced race, gender, and age. arXiv preprint arXiv: 1908.04913 (2019)
20. Karras, T., Laine, S., Aila, T.: A style-based generator architecture for generative adversarial networks. In: Proceedings of the IEEE Conference on Computer Vision and Pattern Recognition. pp. 4401-4410 (2019)
21. Kingma, D. P., Ba, J.: Adam: A method for stochastic optimization. arXiv preprint arXiv:1412.6980 (2014)
22. Park, T., Liu, M. Y., Wang, T. C., Zhu, J. Y.: Semantic image synthesis with spatially-adaptive normalization. In: Proceedings of the IEEE Conference on Computer Vision and Pattern Recognition. pp. 2337-2346 (2019)
23. Pumarola, A., Agudo, A., Martinez, A. M., Sanfeliu, A., Moreno-Noguer, F.: Ganimation: Anatomically-aware facial animation from a single image. In: Proceedings of the European Conference on Computer Vision (ECCV). pp. 818-833 (2018)
24. Ricanek, K., Tesafaye, T.: Morph: A longitudinal image database of normal adult age-progression. In: 7th International Conference on Automatic Face and Gesture Recognition (FGRO6). pp. 341-345. IEEE (2006)
25. Rothe, R., Timofte, R., Van Gaol, L.: Dex: Deep expectation of apparent age from a single image. In: Proceedings of the IEEE international conference on computer vision workshops. pp. 10-15 (2015)
26. Song, J., Zhang, J., Gao, L., Liu, X., Shen, H. T.: Dual conditional gans for face aging and rejuvenation. In: IJCAI. pp. 899-905 (2018)
27. Szegedy, C., Ioffe, S., Vanhoucke, V., Alemi, A. A.: Inception-v4, inception-resnet and the impact of residual connections on learning. In: Thirty-first AAAI conference on artificial intelligence (2017)
28. Wang, Z., Tang, X., Luo, W., Gao, S.: Face aging with identity-preserved conditional generative adversarial networks. In: Proceedings of the IEEE Conference on Computer Vision and Pattern Recognition. pp. 7939-7947 (2018)
29. Yazici, Y., Foo, C. S., Winkler, S., Yap, K. H., Piliouras, G., Chandrasekhar, V.: The unusual effectiveness of averaging in gan training. arXiv preprint arXiv:1806.04498 (2018)
30. Zeng, H., Lai, H., Yin, J.: Controllable face aging. arXiv preprint arXiv:1912.09694 (2019)
31. Zhang, R., Isola, P., Efros, A. A., Shechtman, E., Wang, O.: The unreasonable effectiveness of deep features as a perceptual metric. In: Proceedings of the IEEE Conference on Computer Vision and Pattern Recognition. pp. 586-595 (2018)
32. Zhu, H., Huang, Z., Shan, H., Zhang, J.: Look globally, age locally: Face aging with an attention mechanism. arXiv preprint arXiv:1910.12771 (2019)
33. Zhu, H., Zhou, Q., Zhang, J., Wang, J. Z.: Facial aging and rejuvenation by conditional multi-adversarial autoencoder with ordinal regression. arXiv preprint arXiv: 1804.02740 (2018)
34. Zhu, J. Y., Park, T., Isola, P., Efros, A. A.: Unpaired image-to-image translation using cycle-consistent adversarial networks. In: Proceedings of the IEEE international conference on computer vision. pp. 2223-2232 (2017)

What is claimed is:

1. A computing device comprising:
a face-effect unit including processing circuitry configured to apply at least one facial effect to a source image and to generate a virtual instance of an applied-effect source image on an interface, the face-effect unit utilizing a deep neural network generator to simulate aging with continuous control over a plurality of age related skin signs between a first image and a translated image of the face, the generator configured to automatically translate the first image using respective aging targets for the skin signs;
wherein the aging targets are provided to the generator as an aging map identifying location zones of the face associated with respective ones of the skin signs, where each zone in the aging map is filled with a respective aging target corresponding to the associated skin sign,
wherein the generator comprises a fully convolutional encoder-decoder comprising residual blocks in the decoder to incorporate the aging targets in the form of aging maps;
wherein the generator is configured using a patch-based training methodology using a portion of a particular training image and a corresponding patch of an associated aging map;
wherein the residual blocks further incorporate location information to indicate a respective location of the portion of the particular training image and the corresponding patch of the associated aging map; and
wherein the location information is provided using respective X and Y coordinate maps defined from a horizontal gradient map and a vertical gradient map related to a height and width (H×W) size of the first image.

2. The computing device of claim 1 further comprising:
a recommendation unit including processing circuitry configured to present a recommendation of a product and/or service, and receive a selection of the product and/or service, wherein the product and/or service is associated with an aging target modifier for at least one of the skin signs; and
wherein the face-effect unit is configured to generate the respective aging targets for the skin signs using the aging target modifier in response to the selection thereby to simulate an effect of the product and/or service on the source image.

3. The computing device of claim 2, wherein the recommendation unit is configured to obtain the recommendation by:
invoking a skin sign analyzer to determine current skin sign scores using the source image; and
using the current skin sign scores to determine the product and/or service.

4. The computing device of claim 3, wherein the skin sign analyzer is configured to analyze the source image using a deep learning model.

5. The computing device of claim 1, wherein the interface comprises an e-commerce interface to enable purchases of any of products and services.

6. The computing device of claim 1, wherein the aging maps:
are separate from and different from the first image of the face; and
represent a particular aging target for the associated skin sign by a score value of the associated skin sign.

7. A computing device comprising:
a processing unit configured to: receive a first image of a face and use an age simulation deep neural network generator to generate a translated image for presenting;
wherein the generator simulates aging with continuous control over a plurality of age related skin signs between the first image and the translated image of the face, the generator configured to translate the first image using respective aging targets for each of the skin signs;
wherein the generator comprises a fully convolutional encoder-decoder comprising residual blocks in the decoder to incorporate the aging targets in the form of aging maps;
wherein the generator is configured using a patch-based training methodology using a portion of a particular training image and a corresponding patch of an associated aging map;
wherein the residual blocks further incorporate location information to indicate a respective location of the portion of the particular training image and the corresponding patch of the associated aging map; and
wherein the location information is provided using respective X and Y coordinate maps defined from a horizontal gradient map and a vertical gradient map related to a height and width (H×W) size of the first image.

8. The computing device of claim 7, wherein the aging maps:
are separate from and different from the first image of the face; and
represent a particular aging target for the associated skin sign by a score value of the associated skin sign.

9. The computing device of claim 8, wherein the aging maps are defined to use pixel intensity to represent the aging targets, and mask out a background of the first image.

10. The computing device of claim 9, wherein the aging maps are defined to use pixel intensity to represent the aging targets, and mask out a background of the first image.

11. The computing device of claim 7, wherein the generator is conditional Generative Adversarial Networks (GANs)-based.

12. The computing device of claim 7, wherein the aging map represents a particular aging target for the associated skin sign by a score value of the associated skin sign.

13. The computing device of claim 7, wherein the aging map represents a particular aging target for the associated skin sign by an apparent age value for the associated skin sign.

14. The computing device of claim 7, wherein the generator is configured through training using respective training images and associated aging maps and wherein the associated aging maps provide weak spatial supervision to guide the aging transformations of the respective skin signs.

15. The computing device of claim 7, wherein the skin signs represent ethnic-specific dimensions of aging.

16. The computing device of claim 7, wherein the skin signs further represent one or more of, "age" "forehead wrinkles", "nasolabial fold", "wrinkles underneath the eye", glabellar wrinkles", "inter ocular wrinkles", "corner lips wrinkles", "upper lip" and "ptosis of the lower part of the face".

17. The computing device of claim 7, wherein the generator is a fully convolutional encoder-decoder comprising residual blocks in the decoder to incorporate the aging targets in the form of aging maps.

18. The computing device of claim 7, wherein the particular training image is a high resolution image and a patch size is a portion thereof.

19. The computing device of claim 18, wherein the patch size is ½ or less of the high resolution image.

20. The computing device of claim 7, wherein the generator is configured via an attention mechanism to limit the generator to transforming the age related skin signs while minimizing additional transformations to be applied.

21. The computing device of claim 7, wherein the processing unit is configured to communicate with a second computing device that provides the generator for use, the processing unit communicating the first image and receiving the translated image.

22. The computing device of claim 7, wherein the first image is a high resolution image of 1024×1024 pixels or higher.

23. The computing device of claim 7, wherein the processing unit is further configured to provide an augmented reality application to simulate aging using the translated image.

24. The computing device of claim 23 comprising a camera and wherein the processing unit receives the first image from the camera.

25. The computing device of claim 7, wherein the processing unit is configured to provide at least one of: a recommendation function recommending at least one of a product and service and an e-commerce function with which to purchase at least one of a product and a service.

26. The computing device of claim 25, wherein the product comprises one of a rejuvenation product, an anti-aging product, and a cosmetic make-up product.

27. The computing device of claim 25, wherein the service comprises one of a rejuvenation service, an anti-aging service, and a cosmetic service.

* * * * *